US011411477B2

(12) United States Patent
Kato

(10) Patent No.: US 11,411,477 B2
(45) Date of Patent: Aug. 9, 2022

(54) COIL INSERTION METHOD AND COIL INSERTION DEVICE

(71) Applicant: Yoshio Kato, Komaki (JP)

(72) Inventor: Yoshio Kato, Komaki (JP)

( * ) Notice: Subject to any disclaimer, the term of this patent is extended or adjusted under 35 U.S.C. 154(b) by 12 days.

(21) Appl. No.: 16/907,981

(22) Filed: Jun. 22, 2020

(65) Prior Publication Data

US 2021/0399616 A1    Dec. 23, 2021

(51) Int. Cl.
*H02K 15/085* (2006.01)
*H02K 15/04* (2006.01)
*H02K 3/12* (2006.01)
*H02K 15/02* (2006.01)
*H02K 15/00* (2006.01)

(52) U.S. Cl.
CPC .............. *H02K 15/085* (2013.01); *H02K 3/12* (2013.01); *H02K 15/024* (2013.01); *H02K 15/0464* (2013.01); *H02K 15/0056* (2013.01)

(58) Field of Classification Search
CPC .... H02K 15/085; H02K 3/12; H02K 15/0464; H02K 15/024; H02K 15/0056
See application file for complete search history.

(56) References Cited

U.S. PATENT DOCUMENTS

| 2004/0098856 A1* | 5/2004 | Kuroyanagi | ....... H02K 15/0442 29/596 |
| 2007/0101569 A1* | 5/2007 | Hashimoto | ............ H02K 15/06 29/732 |
| 2007/0261229 A1* | 11/2007 | Yamaguchi | .......... H02K 15/066 29/596 |
| 2017/0179780 A1* | 6/2017 | Tsuiki | ................ H02K 15/0037 |
| 2018/0145549 A1 | 5/2018 | Hino et al. | |

(Continued)

FOREIGN PATENT DOCUMENTS

| JP | 2007166849 A | 6/2007 |
| JP | 4813171 B2 | 9/2011 |
| JP | 2013229974 A | 11/2013 |

(Continued)

OTHER PUBLICATIONS

Japanese Office Action (and English language translation thereof) dated Oct. 27, 2020 issued in Japanese Application No. 2019-148959.

(Continued)

*Primary Examiner* — Peter Dungba Vo
*Assistant Examiner* — Jose K Abraham
(74) *Attorney, Agent, or Firm* — Holtz, Holtz & Volek PC

(57) ABSTRACT

A coil insertion method includes winding U-phase, V-phase, and W-phase coils; inserting the U-phase, V-phase, and W-phase coils into a transfer block, such that the U-phase, V-phase, and W-phase coils are held in a plurality of holding grooves of the transfer block so as to spirally overlap, the transfer block having a columnar shape, and the holding grooves being formed in radial fashion around the transfer block so as to open from a center part of the transfer block toward an outer periphery thereof; inserting the transfer block into an inner periphery of the stator core; and pushing a side part of the coils held in the holding grooves radially outward toward predetermined slots of the stator core so that the coils are inserted from the inner peripheral side of the stator core into the slots.

12 Claims, 48 Drawing Sheets

(56) References Cited

U.S. PATENT DOCUMENTS

2019/0356188 A1* 11/2019 Miyawaki .............. H02K 15/04
2020/0220438 A1* 7/2020 Ide ........................ H02K 3/345

FOREIGN PATENT DOCUMENTS

| JP | 2015100146 A | 5/2015 |
| JP | 2019103241 A | 6/2019 |
| JP | 6573953 B2 | 9/2019 |
| JP | 2019195268 A | 11/2019 |
| WO | 2017056949 A1 | 4/2017 |

OTHER PUBLICATIONS

Japanese Office Action (and English language translation thereof) dated Dec. 25, 2018 issued in Japanese Application No. 2017-231864.

* cited by examiner

COIL INSERTION METHOD AND COIL INSERTION DEVICE

BACKGROUND OF THE INVENTION

1. Field of the Invention

The present invention relates to a coil insertion method and coil insertion device in which a pre-wound coil is inserted into slots of a stator core by being pushed radially outward from an inner peripheral side of the stator core.

2. Description of the Related Art

For example, Japanese Patent No. 4813171 discloses a method for manufacturing a stator formed by inserting one side of each of a plurality of pre-wound coils into slots and then inserting the other side of each of the plurality of coils into other slots, wherein, using a jig in which are formed on the outer periphery thereof a first holding groove group that comprises a plurality of slit-shaped holding grooves and is formed at an integer multiple pitch of the pitch of the slots of the stator core, and a second holding groove group that comprises the same number of holding grooves as the holding grooves of the first holding groove group and is formed at the same pitch as the first holding groove group, one side of a plurality of pre-wound coils is inserted into the first holding groove group and the other side is inserted into the holding groove adjacent to the holding groove in which the one side has been inserted, the coils are arrayed along a circumference of the jig, the jig is inserted into an inner periphery of the stator core, the one side of the coils is pressed out to the outer radial side by pressing-out means and inserted into the corresponding slots in the stator core, the jig is turned a predetermined angle with respect to the slots of the stator core, and the second holding groove group is positioned so as to align with the corresponding slots in the stator core, after which the other side is pressed out to the outer radial side by the pressing-out means and inserted into the corresponding slots in the stator core. According to the manufacturing method described above, a plurality of coils can be inserted into slots one side at a time so as to be spirally overlapping.

SUMMARY OF THE INVENTION

In the manufacturing method of Japanese Patent No. 4813171, one side of the pre-wound coils is inserted into the first holding groove group of the jig, the other side of the coils is inserted into the holding grooves adjacent to the holding grooves in which the one side has been inserted, and in this state, the jig is inserted into the inner periphery of the stator core, and the one side of the coils held the first holding groove group is pressed out to the outer radial side by pressing-out means and inserted into the corresponding slots in the stator core. Next, the jig is turned a predetermined angle with respect to the slots of the stator core, and the second holding groove group is positioned so as to align with the corresponding slots in the stator core, and the other side of the coils held in the second holding groove group is pressed out to the outer radial side by the pressing-out means and inserted into the corresponding slots in the stator core. However, there is a problem in that the turn angle increases when the jig is rotated so that the second holding groove group aligns with the corresponding slots in the stator core, and the coils are therefore forcibly pulled and radial plates positioned between the holding grooves of the jig readily deform as a consequence.

Therefore, an object of the present invention is to provide a coil insertion method and device that are capable of mechanically manufacturing, with good efficiency, a spirally wound stator core.

In order to achieve the above-stated purpose, the coil insertion method of the present invention comprises:

a winding step for winding U-phase, V-phase, and W-phase coils;

a step for inserting coils into a transfer block, in which the U-phase, V-phase, and W-phase coils are inserted and held in a plurality of holding grooves of a transfer block so as to spirally overlap, the transfer block having columnar shape overall, and the holding grooves being formed in radial fashion so as to open from an axial center part toward an outer periphery; and a step for inserting coils into a stator core, in which the transfer block is inserted into an inner periphery of the stator core, and a side part of the coils held in the holding grooves is pressed radially outward toward predetermined slots of the stator core and inserted from the inner peripheral side of the stator core into the slots.

Moreover, the coil insertion device of the present invention comprises:

a winding machine having a bobbin for forming a U-phase coil, a bobbin for forming a V-phase coil, and a bobbin for forming a W-phase coil, the winding machine changing a winding direction to form a plurality of coils along a lengthwise direction of the bobbins;

a transfer block having a columnar shape overall and a plurality of holding grooves radially formed so as to open toward an outer periphery from an axial center part;

a device for inserting coils into the transfer block, in which both side parts of the end face of the bobbins wound by the winding machine are arranged so as to align with the corresponding holding grooves of the transfer block, and both side parts of the coils are sequentially inserted into the corresponding holding grooves, whereby the U-phase, V-phase, and W-phase coils are inserted into the holding grooves so as to spirally overlap; and a device for inserting coils into the stator core, in which the transfer block is inserted into an inner periphery of the stator core, the holding grooves into which the coils in the transfer block have been inserted are aligned with the corresponding slots of the stator core, and the coils are inserted into the slots.

According to the coil insertion method and coil insertion device of the present invention, coils held in a state spirally overlapped in advance on a transfer block are pressed radially outward toward predetermined slots in a stator core and are inserted into the slots from the inner peripheral side of the stator core, whereby the coils can be inserted in a spirally overlapping state into the slots in the stator core, and the coil ends can be shortened. As such, a spirally wound stator core that can make rotation smooth can be mechanically manufactured with good efficiency, whereby the efficiency of a motor, etc., can be increased.

DESCRIPTION OF THE PREFERRED EMBODIMENTS

An embodiment of the present invention is described below with reference the drawings.

Figure 1:
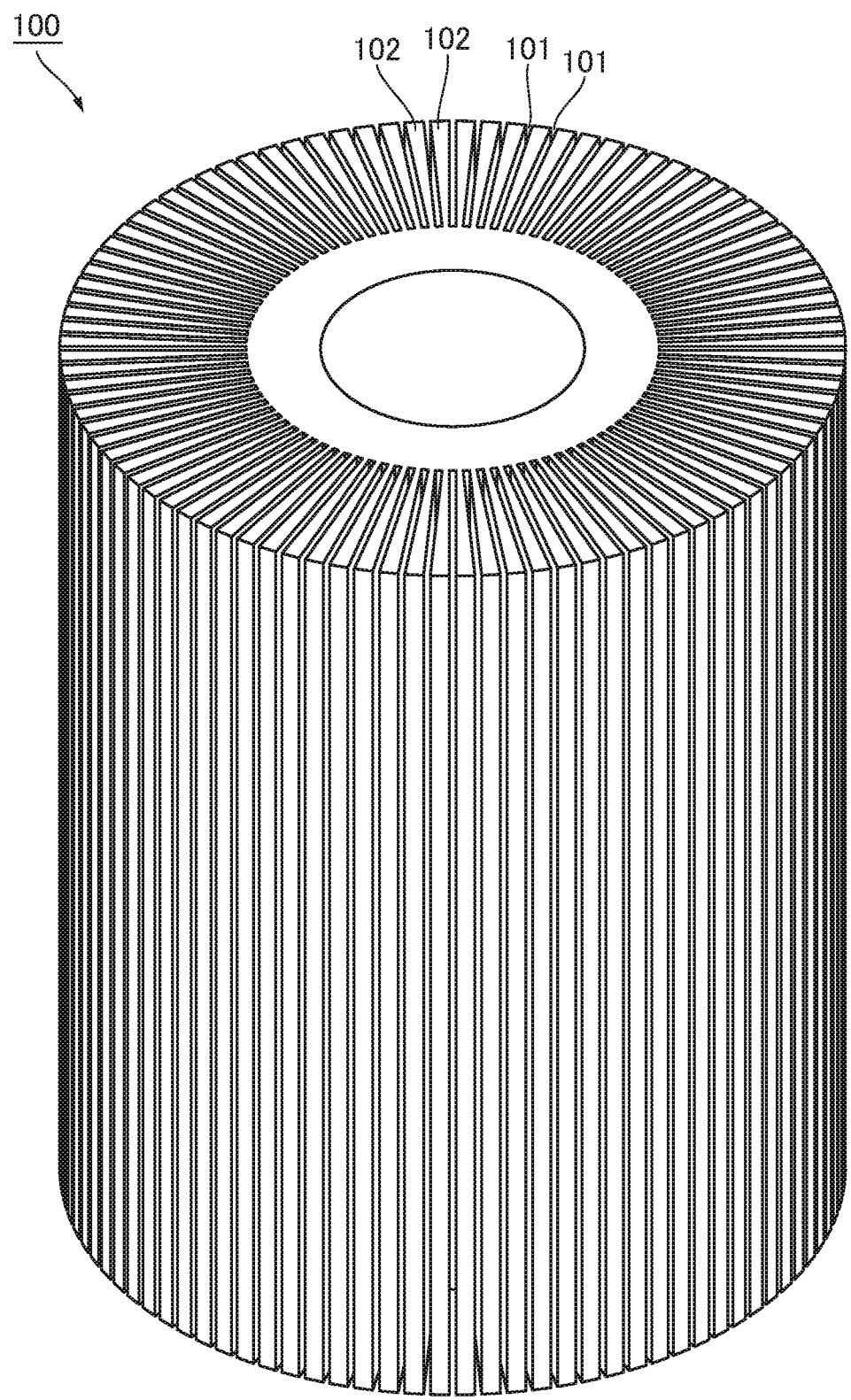
FIG. 1 is a perspective view showing an example of a transfer block used in the coil insertion device of the present invention.

FIG. 1 shows a transfer block 100 used in the coil insertion device of the present invention. The transfer block 100 has a cylindrical shape overall, has a plurality of holding grooves 101 formed in radial fashion so as to open toward the outer periphery from an axial center part, and has a plurality of vane parts 102 that extend in radial fashion between the holding grooves 101. The transfer block 100 is configured so that a side part of coils C are inserted and held in the holding grooves 101, and so as to be inserted into the inner periphery of the stator core 120 (see FIGS. 3, 4).

Figure 2:
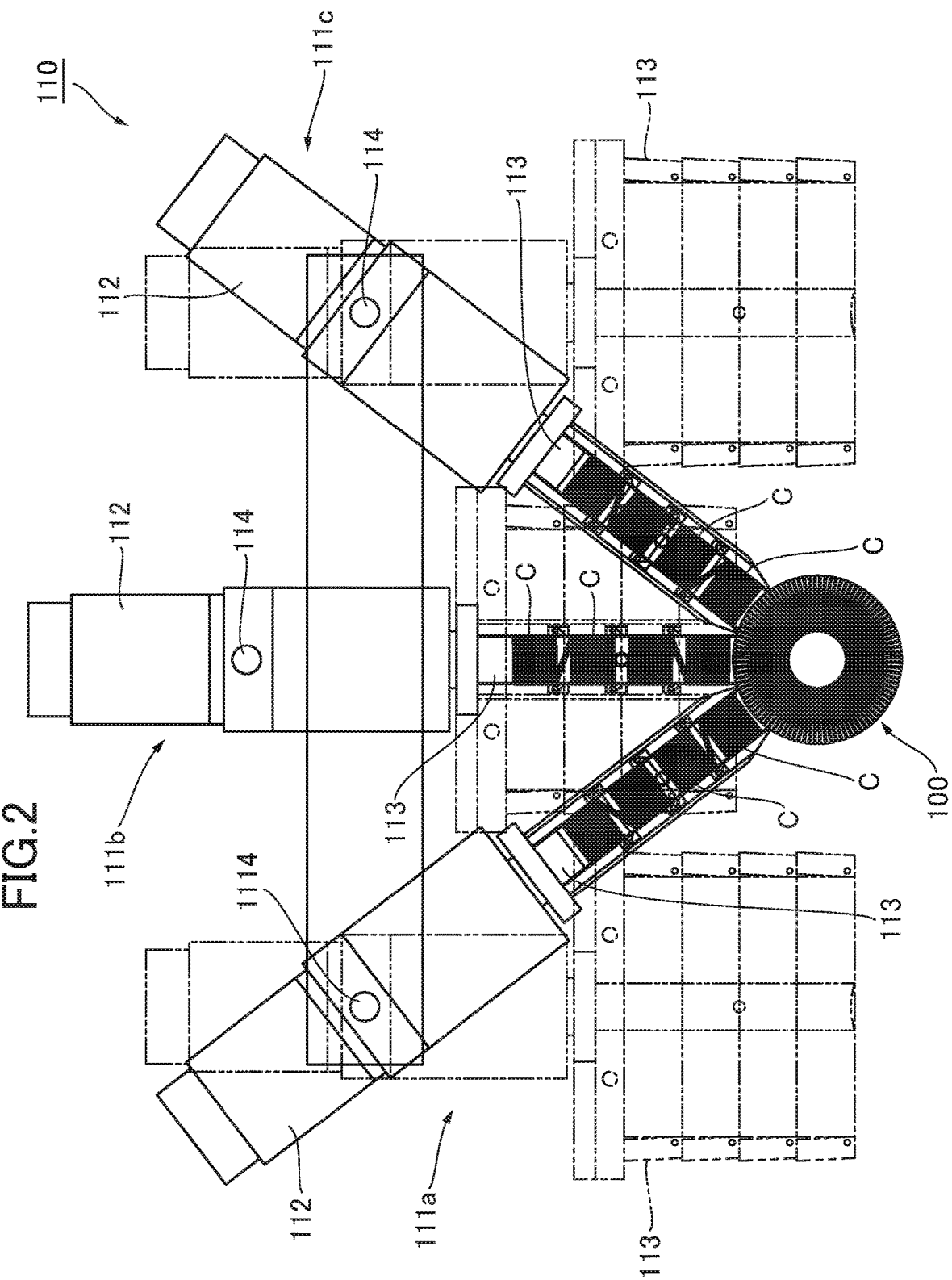
FIG. 2 is a schematic plan view showing examples of a winding machine and a device for inserting coils into the transfer block used in the coil insertion device of the present invention.

FIG. 2 shows a winding and insertion device 110 for winding the coils C and inserting the coils C into the holding grooves 101 of the transfer block 100 (corresponding to the winding machine and the device for inserting coils into the transfer block in the present invention). The winding and insertion device 110 has a U-phase winding machine 111a for forming U-phase coils C, a V-phase winding machine 111b for forming V-phase coils C, and a W-phase winding machine 111c for forming W-phase coils C (these are hereinafter generically referred to as "winding machine 111").

Each winding machine 111 is provided with a motor 112 and a bobbin 113 caused to rotate by the motor 112, and is configured so as to wind an electric wire supplied from an electric wire supply device (not shown) to form a coil C. A plurality of the coils C, four in this embodiment, is formed by changing the winding direction along the longitudinal direction of the bobbins 113.

Also, the winding machines 111 can be turned via a turn shaft 114, and after the coils C have been wound, the end face of the bobbins 113 can be oriented toward the corresponding holding groove 101 of the transfer block 100 by turning about the turn shaft 114. The transfer block 100 is turnably held by the turn shaft (not shown) inserted into a shaft hole of the transfer block, and is capable of turning so that both side parts of the end faces of the bobbins 113 of the winding machines 111 are aligned with predetermined holding grooves 101. In the present invention, a device is provided for inserting coils into the transfer block in which both side parts of the coils C wound onto the bobbins 113 are inserted into the corresponding holding grooves 101 of the transfer block 100.

Figure 26:
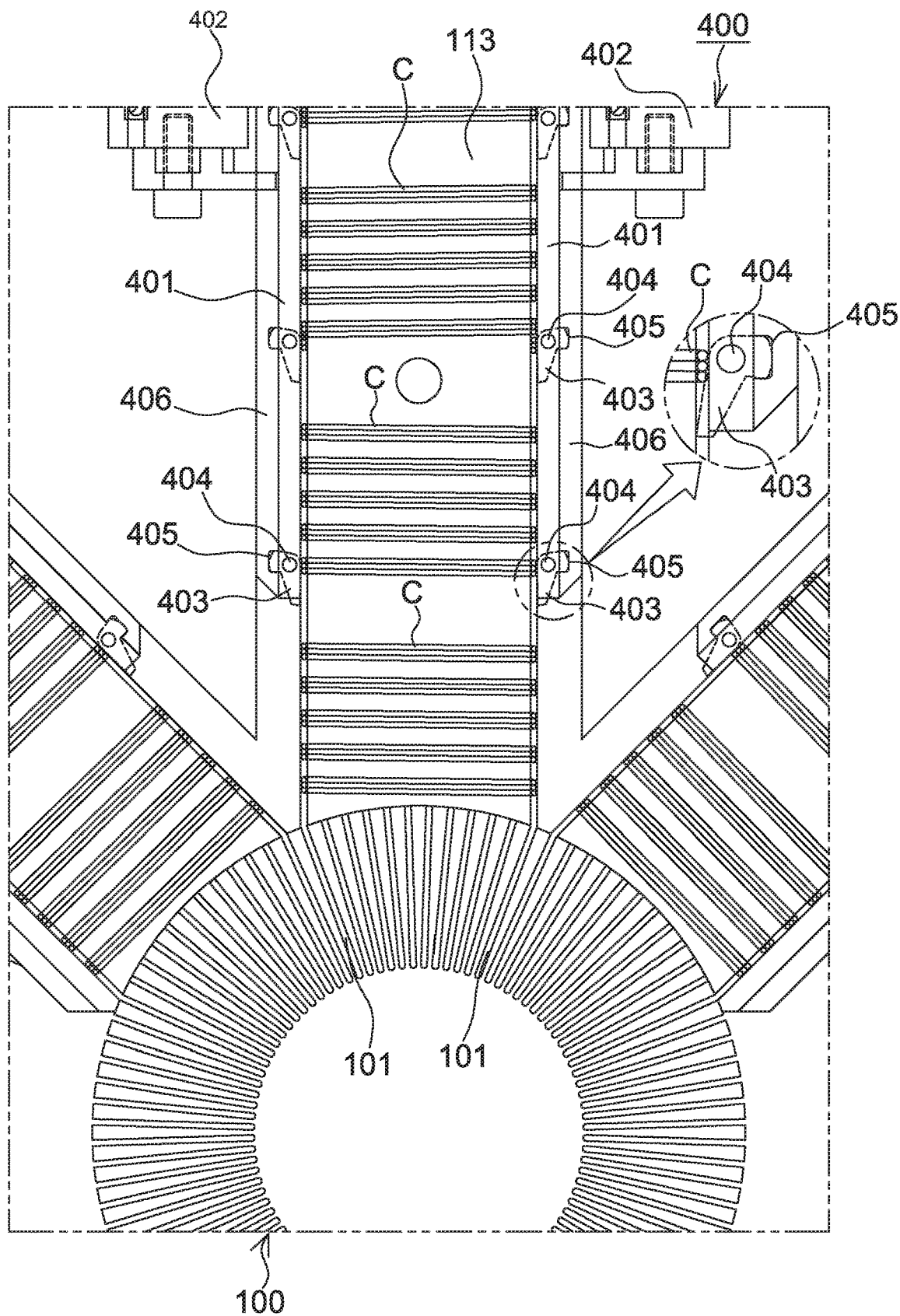
FIG. 26 is an enlarged explanatory view of the main parts of the device for inserting coils into the transfer block used in the present invention.

As shown in FIG. 26, the device 400 for inserting coils into the transfer block has first slide plates 401 arranged on both sides of the bobbin 113, and second slide plates 406 are arranged on the outer side of the first slide plates 401. The second slide plates 406 can slide in the lengthwise direction along the side surface of the bobbin 113 by means of an air cylinder 402.

A plurality of pawls 403 are attached to the first slide plates 401 so as to be capable of turning around a spindle 404, the distal end part of the pawls being oriented in the direction of the transfer block 100 on the bobbin 113. The distal end part of the pawls 403 is oriented in the direction of the transfer block 100, and the base end part of the pawls is inserted into a notched recess 405 formed in the second slide plates 406 with the spindle 404 disposed between the distal and base end parts. A cam face is formed between the base end side of the pawls 403 and the inner surface of the notched recess 405. When the second slide plates 406 slide in the direction toward the transfer block 100 by means of the air cylinder 402, the distal end part of the pawls 403 makes contact with the bobbin 113 by the action of the cam face and is set in a position for engaging the coils C, as shown in the partial enlarged view enclosed in a circle in FIG. 26. When the second slide plates 406 slide in the direction away from the transfer block 100 by means of the air cylinder 402, the distal end part of the pawls 403 moves away from the bobbin 113 and is set in a position of non-engagement with the coils C by the action of the cam face.

Therefore, when the second slide plates 406 slide in the direction of the transfer block 100 by means of the air cylinder 402, the distal end part of the pawls 403 move while in contact with bobbin 113 by the action of the cam face, the distal end part of the pawls 403 engages the coils C, and the coils C are moved in the end face direction. Both side parts of the coils C arranged on the end-most face side are thereby inserted into the corresponding holding groove 101 of the transfer block 100. When insertion of the coils C is completed, the air cylinder 402 actuates again, and the second slide plates 406 slide in the direction away from the transfer block 100. At this time, the distal end part of the pawls 403 moves away from the bobbin 113 by the action of the cam face, and the pawls 403 move and ride over the coils C without catching on the coils C and return to the original position.

By repeating the above-described operation, a plurality coils C wound around the bobbin 113 can sequentially move in the direction of the end face of the bobbin 113 near the transfer block 100 and be inserted into the corresponding holding grooves 101 of the transfer block 100. Insertion of the U-phase coils C formed by the U-phase winding machine 111a, the V-phase coils C formed by the V-phase winding machine 111b, and the W-phase coils C formed by the W-phase winding machine 111c into the corresponding holding grooves 101 of the transfer block 100 is preferably carried out in sequence one coil at a time while rotating and positioning the transfer block 100 so that the holding grooves 101 are offset one at a time in order to insert the coils into the holding grooves 101 of the transfer block 100 so as to be spirally overlapping.

In the case of this embodiment, a 48-slot stator core 120 is used, and therefore, the sequence of coil insertion can be carried out in a cycle of, e.g., "U phase>U phase>V phase>V phase>W phase>W phase" as a single pole, and by repeating the sequence. Thus, the coils C of the U phase, V phase, and W phase can be inserted and held in the holding grooves 101 of the transfer block 100 so as to spirally overlap.

The phrase "spirally overlap" in the above description refers to a coil shape formed by relatively rotating the transfer block 100 with respect to the stator core 120, and inserting the coils C so as to sequentially overlap while the holding grooves 101 are positioned so as to be offset one at a time. At this time, one side of a coil rides up onto a previously inserted coil, the other side of the coil is arranged in a portion where a coil has not yet been arranged, and the coils are arranged while diagonally overlapping so as to fall down one upon another.

In the process for the insertion work to make one cycle, the previous coil has already been inserted and the coil will be overlapped, and therefore, the diagonally overlapping state partially breaks down, but such a partial breakdown does not greatly affect the motor performance and can therefore be permitted. However, in the process for the insertion work to make one cycle, an operation is carried out in which the one side of the coil already inserted is temporarily removed from the holding groove 101, the other side of the coil to next be inserted is inserted into the inner side thereof, and the one side of the removed coil is re-inserted into the holding groove so as to overlap the other coil, and a shape is obtained in which the coils spirally overlap along the entire periphery.

In the case of this embodiment, the insertion angle of both side parts of the coils C into the holding grooves 101 of the transfer block 100, i.e., the angle between holding grooves 101 into which both side parts of the coils C are to be inserted is an angle that is over ½ the array interval of the slots 121 of the stator core 120 with respect to the insertion angle into the corresponding slots 121 in the stator core 120.

Figure 3:
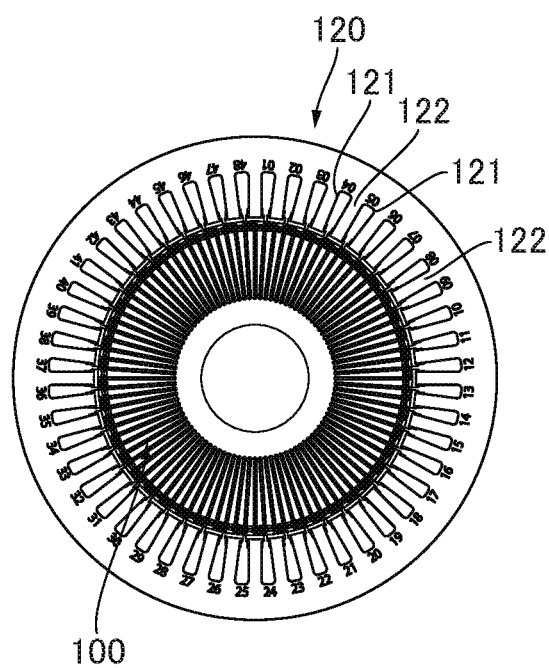
FIG. 3 is a plan view showing the transfer block, with coils inserted and held, inserted into the inner periphery of the stator core in an embodiment of the coil insertion device of the present invention.
Figure 4:
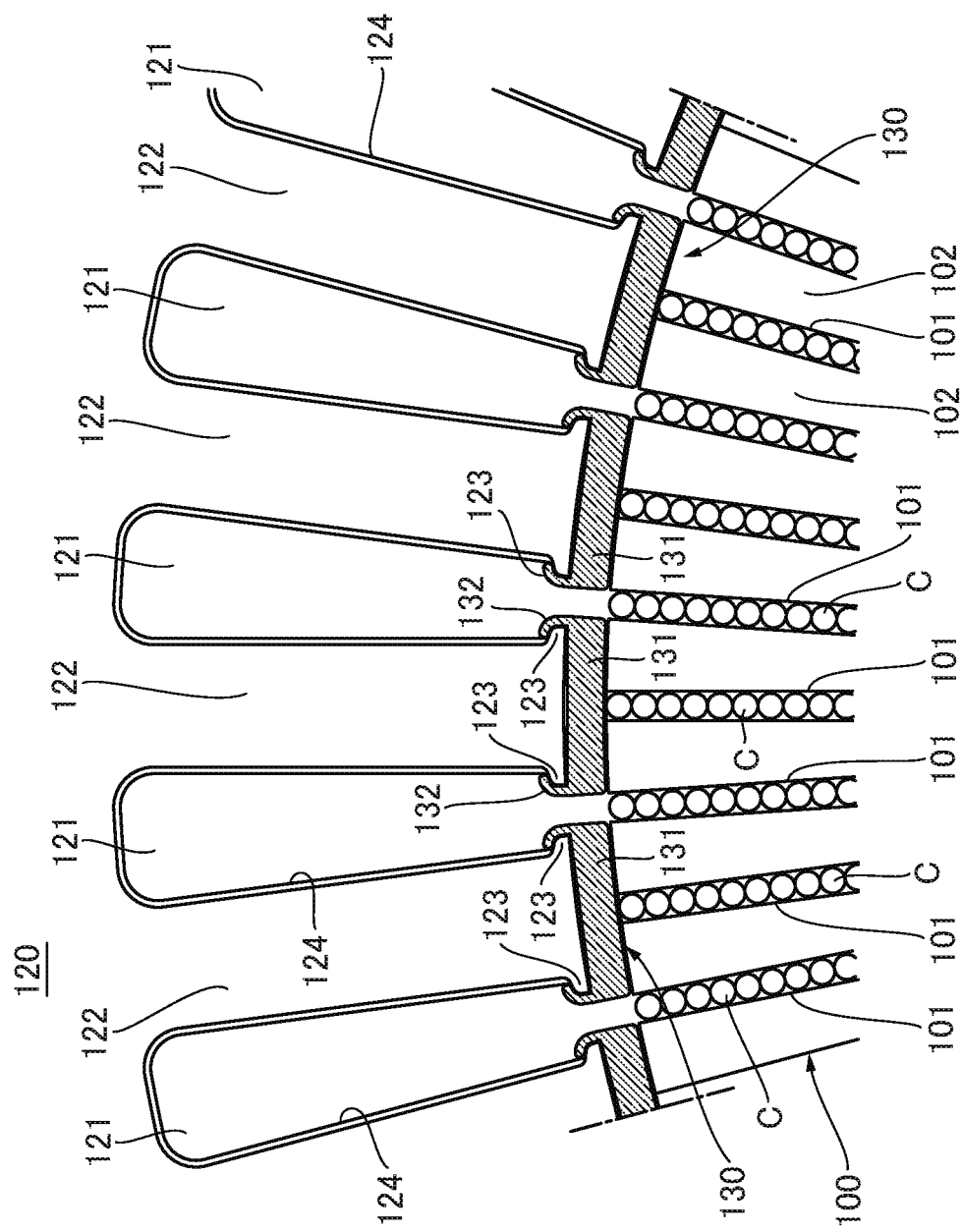
FIG. 4 is a partial enlarged view of FIG. 3.

FIGS. 3 and 4 show a state in which the transfer block 100, with the coils C thusly inserted and held, has been inserted into the inner periphery of the stator core 120. The stator core 120 has a cylindrical shape overall, slots 121 are formed at predetermined intervals on the inner periphery thereof, and the spaces between the slots 121 are teeth 122. A diameter-expanding rib 123 is formed at the distal end part of the teeth 122. A slot insulation sheet 124 is inserted in advance into the slots 121.

Figure 22:
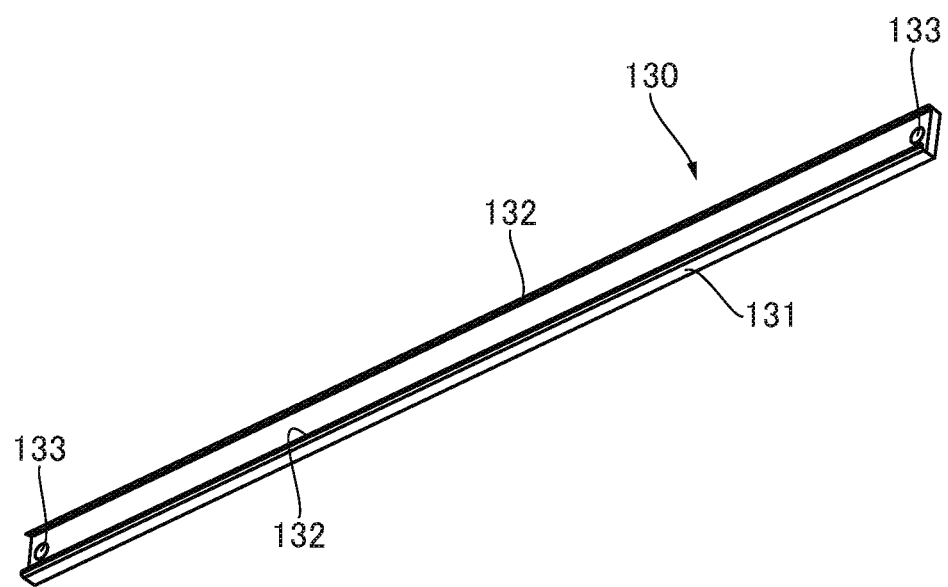
FIG. 22 is a perspective view showing a first embodiment of the cover member used in the present invention.

In this embodiment, a cover member 130 is provided for covering the distal end face of the teeth 122, a side face of the diameter-expanding rib 123, and the back surface of the diameter-expanding rib 123. The cover member 130 has a cover body 131 for covering the distal end face of the teeth 122, and a rib cover 132 for covering the side face and back surface of the diameter-expanding rib 123. The cover member 130 comprises a rod-shaped member that extends in the axial direction of the stator core 120 in the cross-sectional shape shown in FIG. 4, and has the shape shown in FIG. 22 when seen in a perspective view. A stopper hole 133 into which a later-described stopper pin 152 (see FIGS. 5, 6, 7) is inserted is formed in both end parts of the cover member 131. In a later-described mode, the cover members 130 are inserted so as to fit onto the diameter-expanding ribs 123 of the teeth 122 from the end face direction of the stator core 120.

The transfer block 100 is arranged on the inner periphery of the cover members 130 mounted on the end face of the teeth 122. In the case of this embodiment, the holding grooves 101 of the transfer block 100 are arranged at an interval of ½ the array interval of the slots 121 of the stator core 120, and are a quantity that is two times the number of slots 121 of the stator core 120. In the state shown in FIG. 4, the holding grooves 101 into which one side of the coils C has been inserted are aligned with the opening part of the corresponding slots 121, and the holding grooves 101 in which the other side of the coils C has been arranged are in a state in which the opening part has been blocked by the cover body 131 of the cover members 130. The holding grooves 101 of the transfer block 100 may be arranged in the same array interval as the slots 121 of the stator core 120, and may be the same in number as the slots 121 of the stator core 120.

Figure 5:
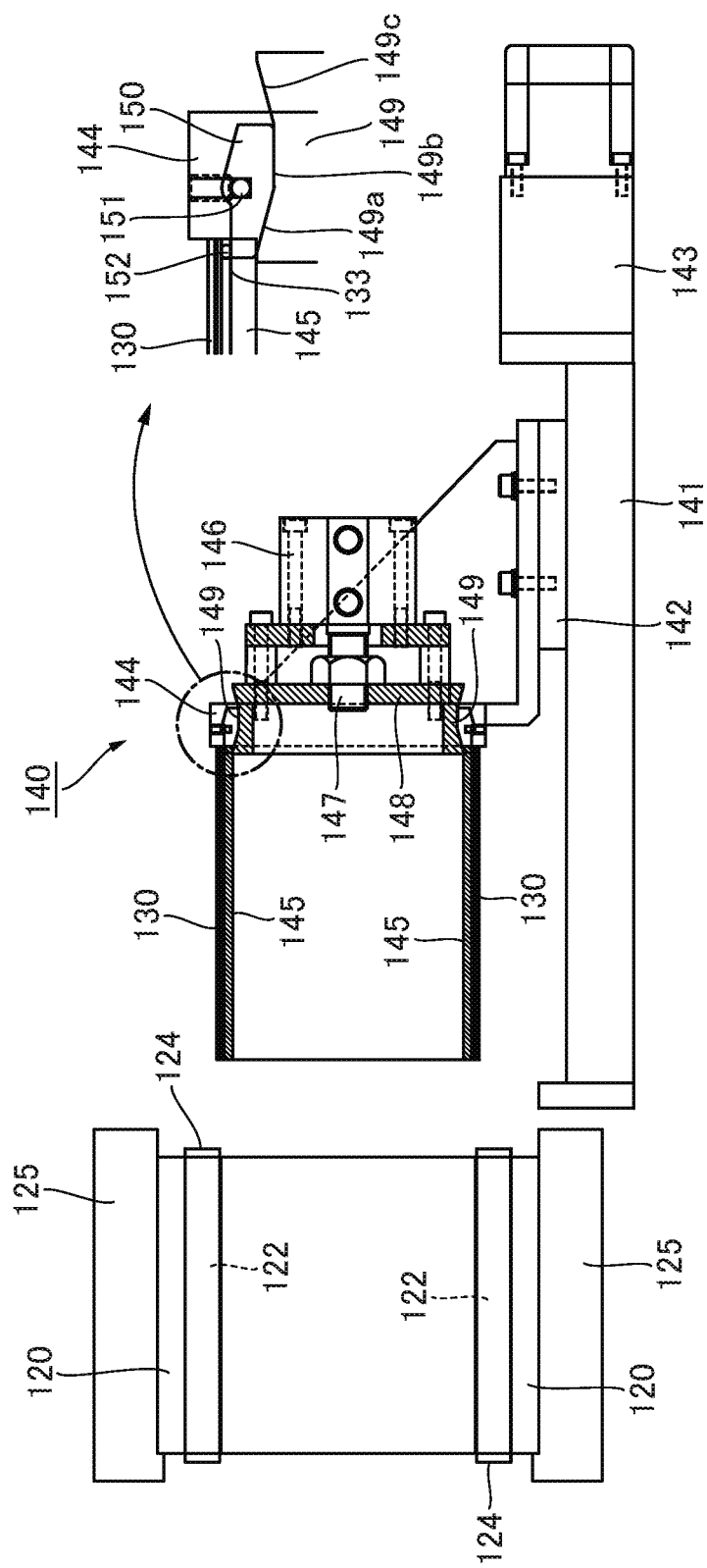
FIG. 5 is an example of a cover member attaching/detaching device used in the coil insertion device of the present invention and that attaches/detaches a cover member on a distal end part of the teeth of the stator core, and is an explanatory view showing a state prior to the cover member being mounted.
Figure 6:
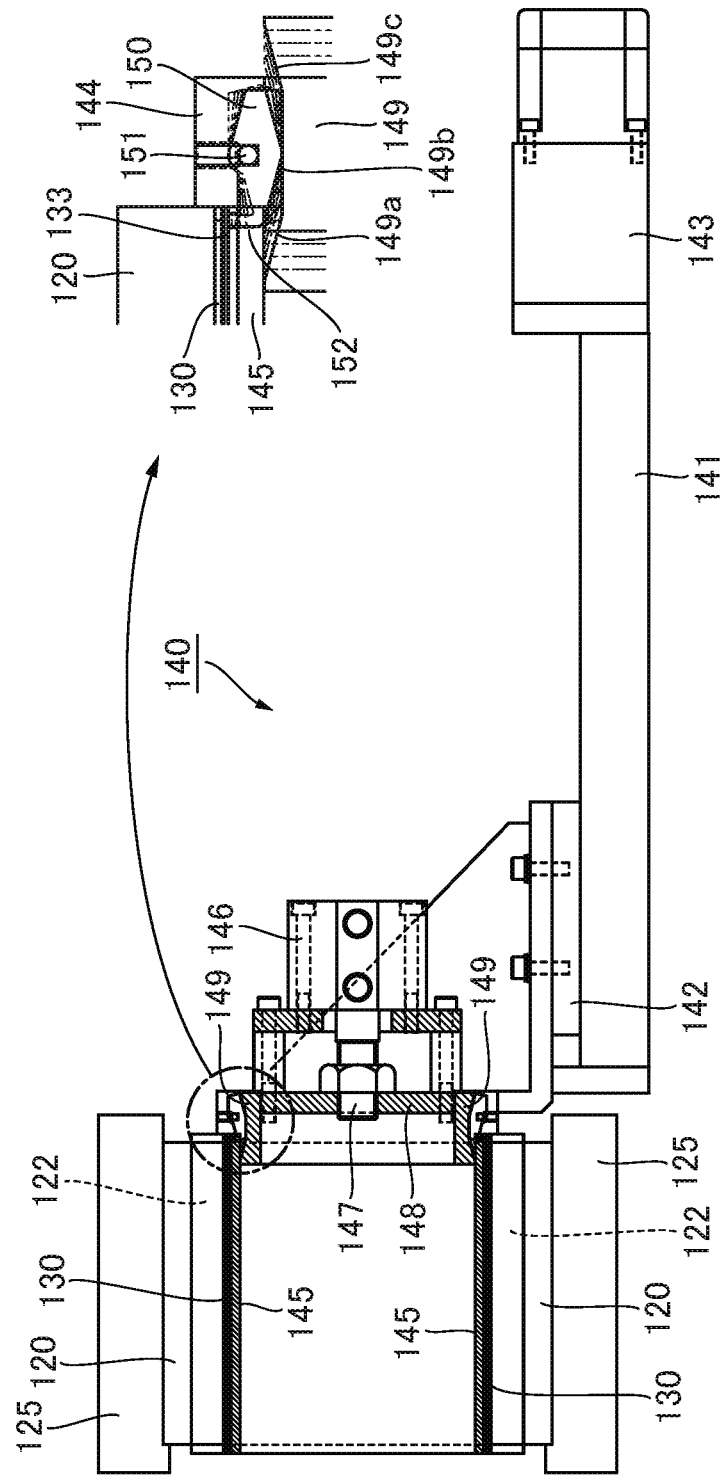
FIG. 6 is an explanatory view showing a state in which the cover member has been mounted on the distal end part of the teeth of the stator core by the cover member attaching/detaching device.
Figure 7:
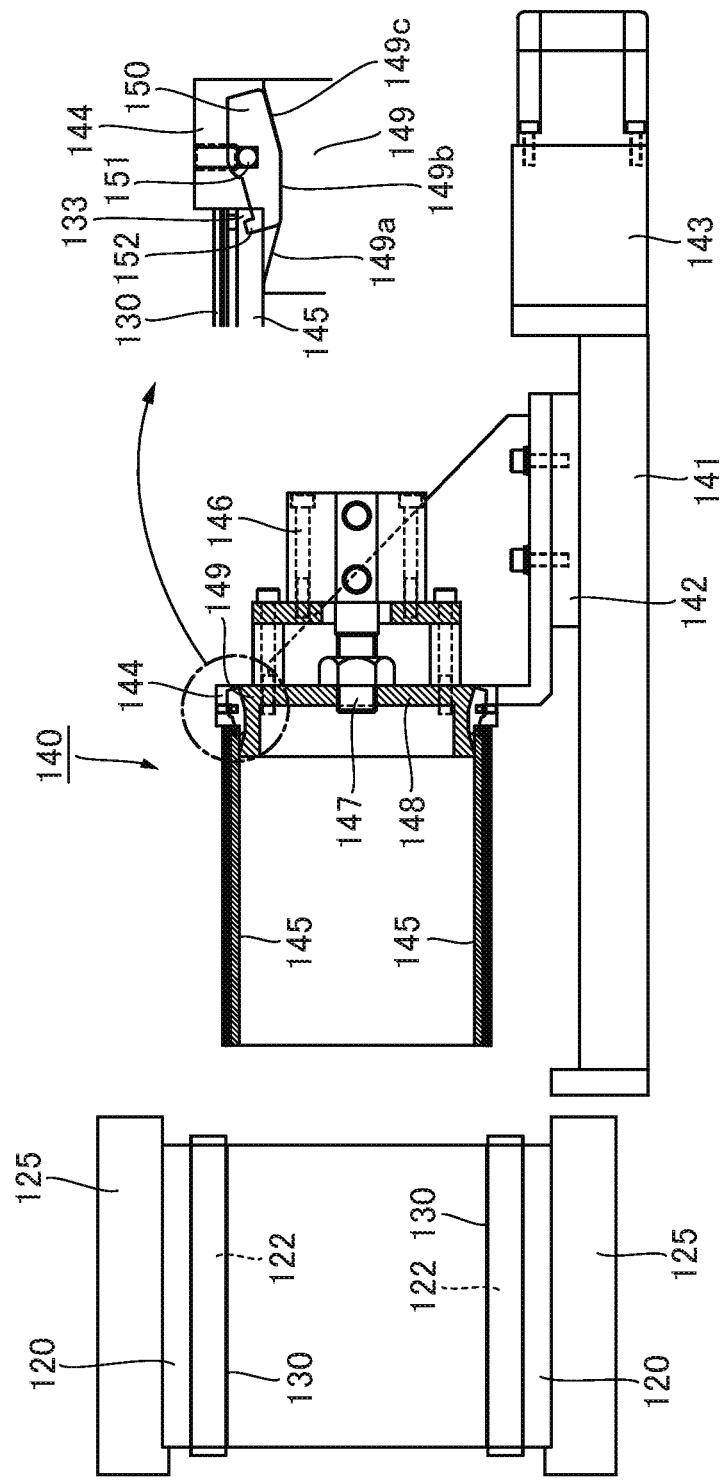
FIG. 7 is an explanatory view showing a state in which the cover member has been mounted on the distal end part of the teeth of the stator core by the cover member attaching/detaching device, and the device has been retracted.
Figure 23:
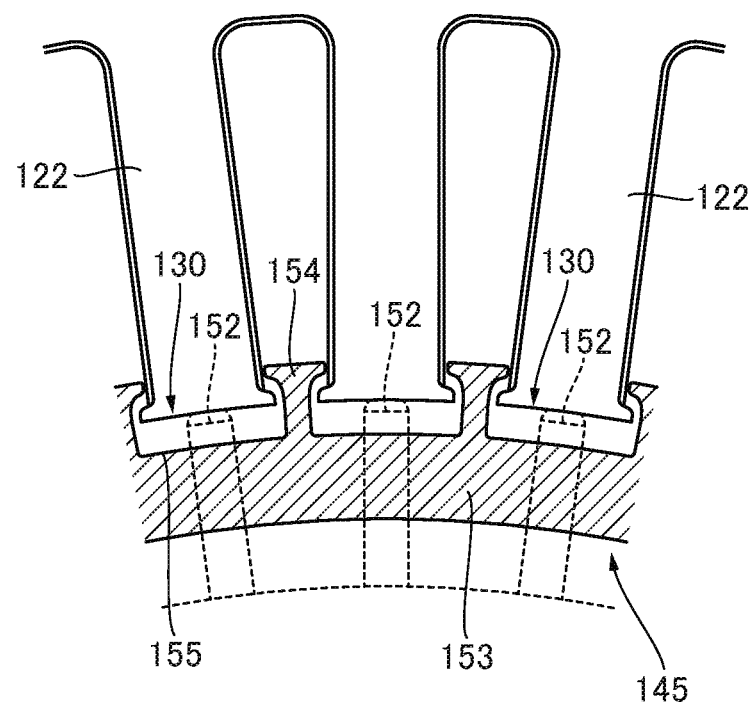
FIG. 23 is a partial sectional view the cover member and the holder thereof in the coil insertion device of the present invention.

FIGS. 5, 6, and 7 show a cover member attaching/detaching device 140 for mounting or removing the cover members 130 from the distal end part of the teeth 122 of the stator core 120. The cover member attaching/detaching device 140 has a base 141 in which a ball screw (not shown) is housed, a slide block 142 installed so as to be capable of threadably engaging and moving the ball screw of the base 141, a first servomotor drive device 143 for rotating the ball screw and moving the slide block 142, a support plate 144 installed so as to stand upright from the upper surface of the slide block 142 in an L shape as viewed from the side, and a cylindrical holder 145 that extends outward in the horizontal direction from the erect face of the support plate 144. As shown in FIG. 23, the holder 145 has a cylindrical body 153, ribs 154 T-shaped in cross section that stand erect in radial fashion from the outer periphery of the body 153, and accommodation grooves 155 for the cover members 130 that are provided between the ribs 154.

The cover members 130 are configured so as to be inserted and held from the end face direction of the holder 145 in the accommodation grooves 155 of the holder 145. The stopper holes 133 are formed in the end parts of the cover members 130. A first air cylinder 146 is installed in the support plate 144, a cam member 149 is connected to a drive rod 147 of the first air cylinder, and the cam member 149 advances and retracts in accordance with the actuation of the first air cylinder 146. In relation thereto, a cam follower 150 is pivotably mounted on the support plate 144 via a spindle 151. The cam follower 150 is provided in plurality in corresponding fashion to the holders 145 for supporting the cover members 130, and has a stopper pin 152 for catching and releasing the stopper hole 133 formed in the cover member 130. A front slope face 149a, a flat face 149b, and a rear slope face 149c are formed on the outer periphery of the cam member 149. In a state in which the cam member 149 is retracted (the state in FIG. 5), the shape of the bottom face of the cam follower 150 is configured so as to conform to the front slope face 149a and the flat face 149b to engage the stopper pin 152 in the stopper hole 133, and in a state in which the cam member 149 is advanced (the state in FIG. 7), the shape of the bottom face conforms to the flat face 149b and rear slope face 149c to disengage the stopper pin 152 from the stopper hole 133.

Therefore, as shown in FIG. 5, the cover member 130 is supported by the holder 145, and in that state the cam member 149 is retracted, the bottom face of the cam follower 150 is brought into conformity with the front slope face 149a and the flat face 149b, and the stopper pin 152 is caused to engage the stopper hole 133, thereby allowing the cover member 130 to be held.

Next, as shown in FIG. 6 the slide block 142 is advanced by the first servomotor drive device 143, the cover member 130 is inserted from the end face side of the stator core 120 so as to cover the distal end part of the teeth 122. At this time, the stator core 120 is held by a core holder 125.

In this state, the cam member 149 is retracted by the first air cylinder 146, the cam follower 150 is turned so that the bottom face of the cam follower 150 conforms to the flat face 149b and the rear slope face 149c, and the stopper pin 152 is removed from the stopper hole 133 of the cover member 130 to release engagement.

As shown in FIG. 7, the slide block 142 is retracted by the first servomotor drive device 143, the cover member 130 is left on the stator core 120 side, and the holder 145 is removed from the stator core 120. Thus, a state in which the cover members 130 are mounted on the teeth 122 of the stator core 120 is the state shown in FIG. 4.

Next, the device for inserting coils into the stator core of the present invention will be described (only a pusher 160 is shown) with reference to FIGS. 8 to 12. In the drawings, the side part of the coils C held in in the holding grooves 101 of the transfer block 100 is pushed radially outward toward the predetermined slots 121 of the stator core 120, and the coils are inserted into the slots 121 from the inner peripheral side of the stator core 120.

The device for inserting coils into the stator core has a pusher 160 for pushing the side part of the coils C radially outward toward predetermined slots 121 in the stator core 120. There are, as pushers, a pusher 160 for inserting one side of the coils C into predetermined slots 121 in the stator core 120, and a pusher for inserting the other side of the coils C into predetermined slots in the stator core 120, but the pusher 160 for inserting the one side of the coils into predetermined slots 121 in the stator core 120 will be described here.

Figure 8:
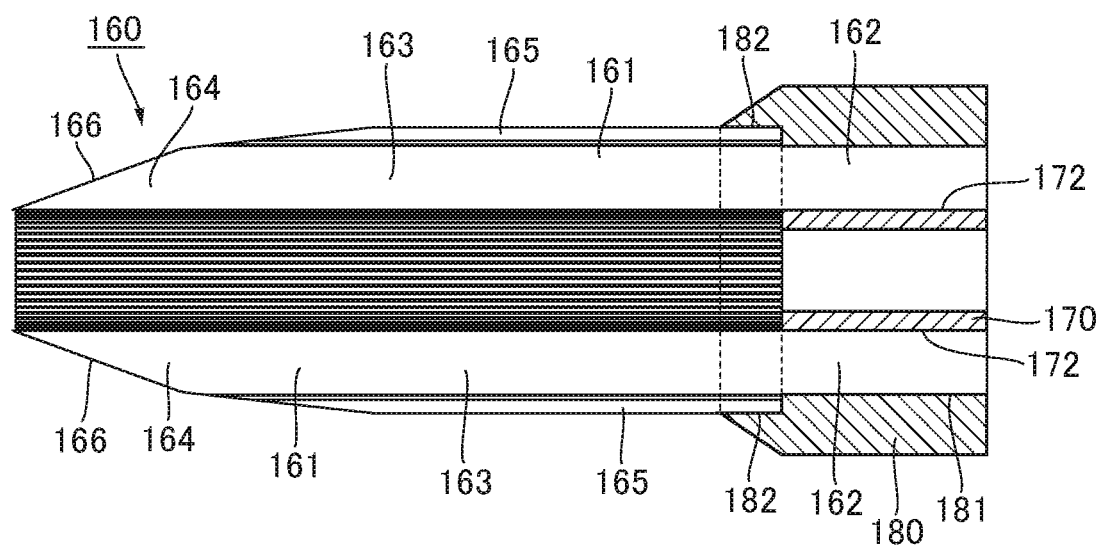
FIG. 8 is a lateral sectional view showing an example of a pusher used in the coil insertion device of the present invention.
Figure 9:
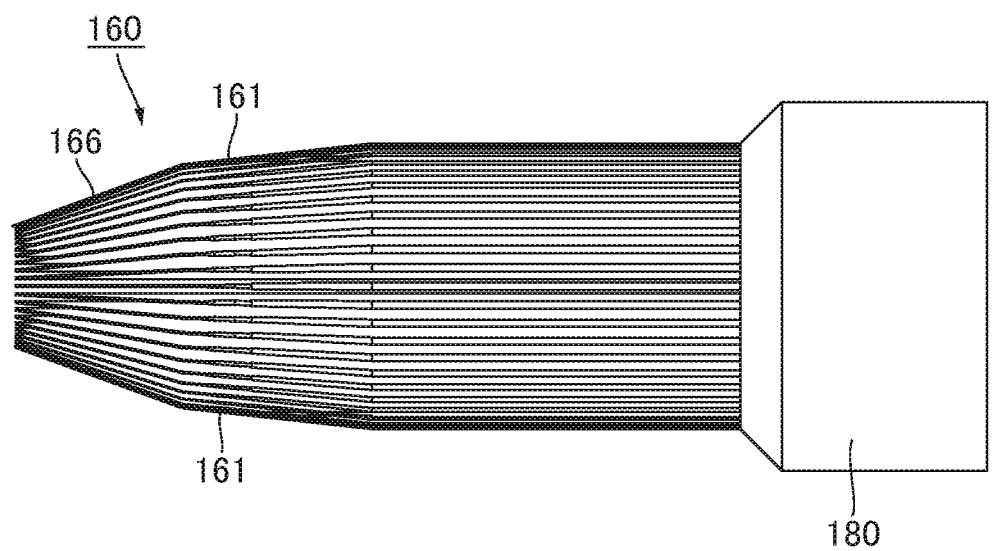
FIG. 9 is a lateral view of the pusher.

As shown in FIGS. 8 and 9, the pusher 160 has a plurality (in the present embodiment, half the number of holding grooves 101) of blades 161 that are inserted from one end face side of the transfer block 100 into the holding grooves 101 of the transfer block 100, and a blade holder 170 and end former 180 for holding the base part 162 of the blades 161.

Figure 10:
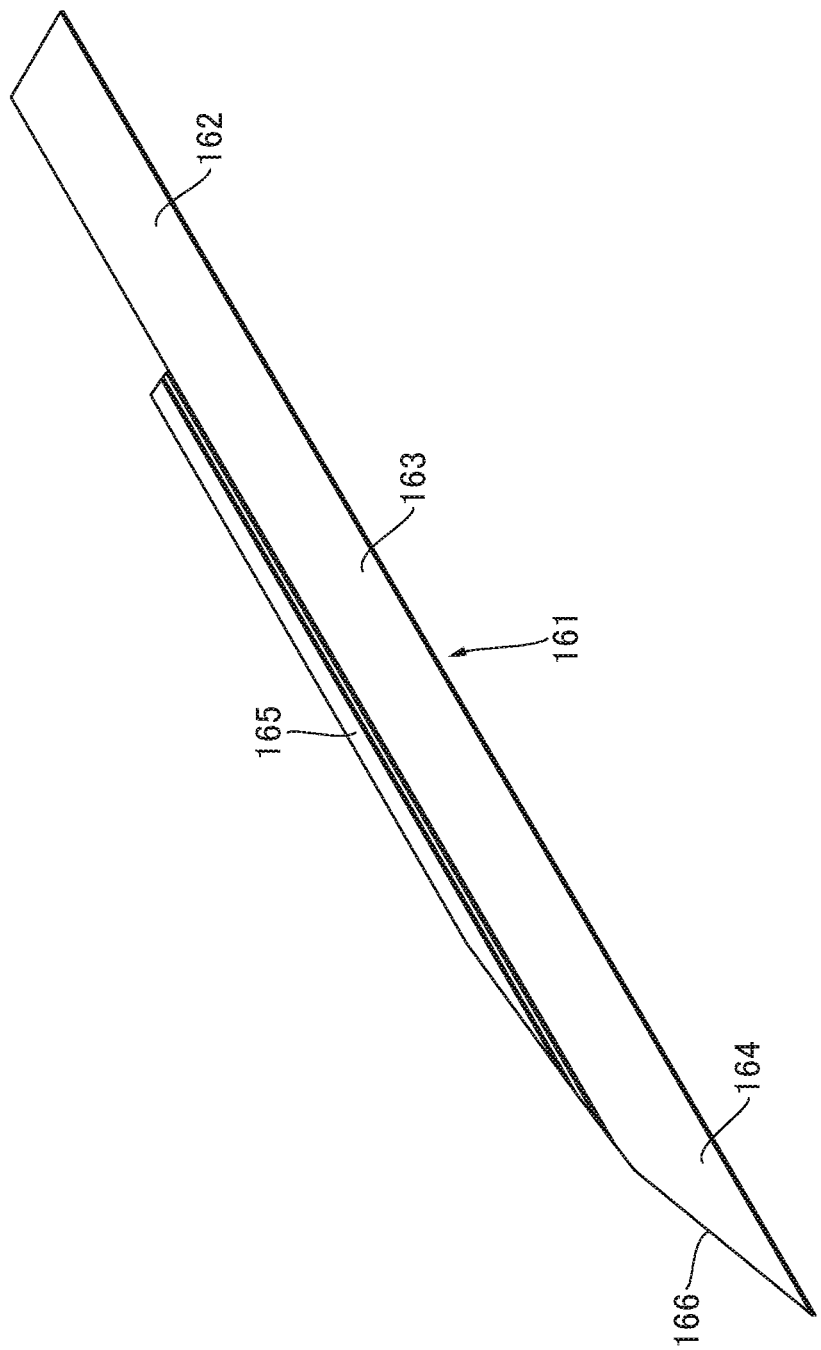
FIG. 10 is a perspective view showing a blade used in the pusher.

As shown in FIG. 10, the blade 161 extends in a long narrow plate shape overall, and has a base part 162, an intermediate part 163, and a distal end part 164. A thick part 165 is formed on one side (the side arranged on the outer peripheral side of the transfer block 100) of the intermediate part 163, and a coil pressing part 166 sloped so as to gradually narrow in width toward the distal end is formed on one side of the distal end part 164. The distal end side of the thick part 165 has a tapered shape whose height gradually decreases.

Figure 11:
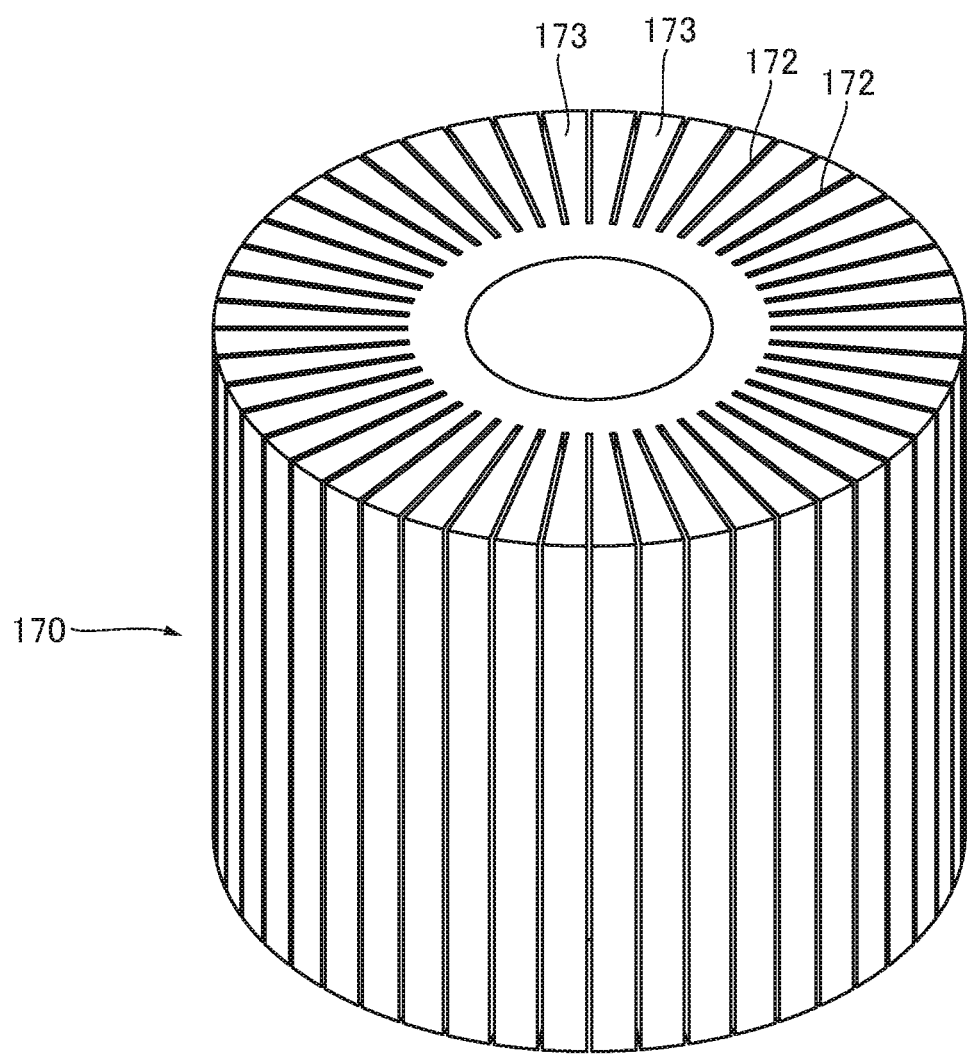
FIG. 11 is a perspective view showing a blade holder used in the pusher.

Moreover, as shown in FIG. 11, the blade holder 170 has a cylindrical body 171, a plurality of insert grooves 172 formed in radial fashion facing the outer periphery from the center part of the body 171, and a plurality of support pieces 173 formed between the insert grooves 172. The insert grooves 172 are provided to correspond to the slots 121 of the stator core 120. The base part 162 of the blade 161 is configured so as to be inserted into the insert grooves 172.

Figure 12:
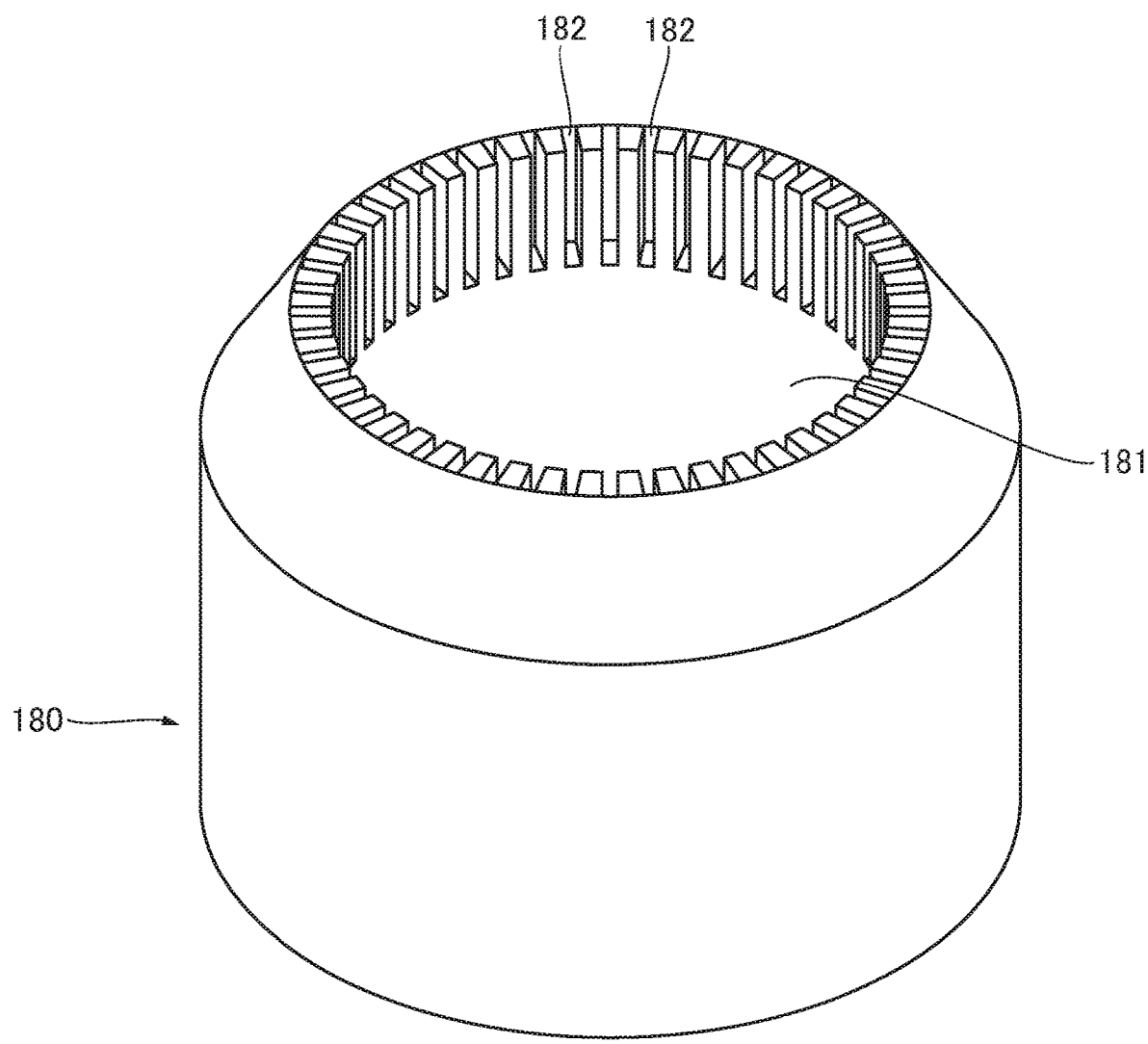
FIG. 12 is a perspective view showing an end former used in the pusher.

Furthermore, the end former 180 is configured so that the blade holder 170 is inserted into an inner periphery 181 of the end former, as shown in FIG. 12. A plurality of support grooves 182, into which the base part side of the thick part 165 of the blades 161 is inserted, is formed at predetermined intervals in the peripheral direction in the upper part of the inner periphery 181.

Therefore, the base part 162 of the blades 161 is inserted into the insert grooves 172 of the blade holder 170 with the blade holder 170 arranged in the inner periphery of the end former 180, the base end side of the thick part 165 of the blades 161 is inserted into the support grooves 182 of the end former 180, whereby the blades 161 are held by the blade holder 170 and the end former 180. The blade holder 170 and the end former 180 are secured to each other by securing means (not shown) with the blades 161 held in place.

In the state shown in FIGS. 3 and 4, the distal end part of the blades 161 of the pusher 160 is inserted into the holding grooves 101 from one end face side of the transfer block 100, whereby a side part of the coils C held in the corresponding holding grooves 101 is pressed by the coil pressing part 166 of the blades 161 and inserted into the slots 121 by way of a gap between the teeth 122 covered by the cover members 130. Furthermore, the thick part 165 of the pusher 160 is inserted into the slots 121, whereby the coils C inserted into the slots 121 are pushed deep into the slots 121. At this time, the distal end part of the teeth 122 is covered by the cover members 130, whereby the coils C do not come into direct contact with the teeth 122, and damage to the coils C can thus be prevented.

Figure 13:
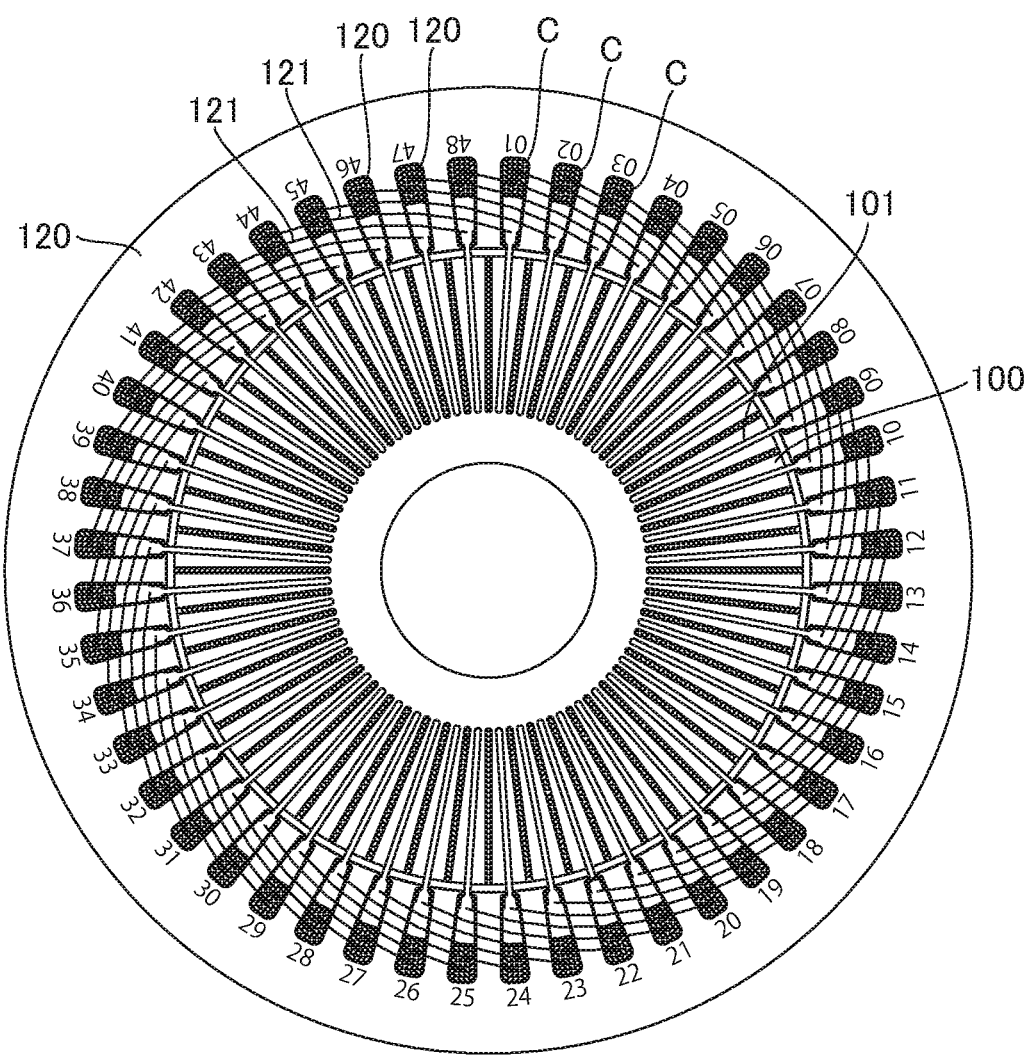
FIG. 13 is an explanatory view showing a state in which one side of the coils has been inserted into the outer radial side of the slots of the stator core by the coil insertion device of the present invention.
Figure 14:
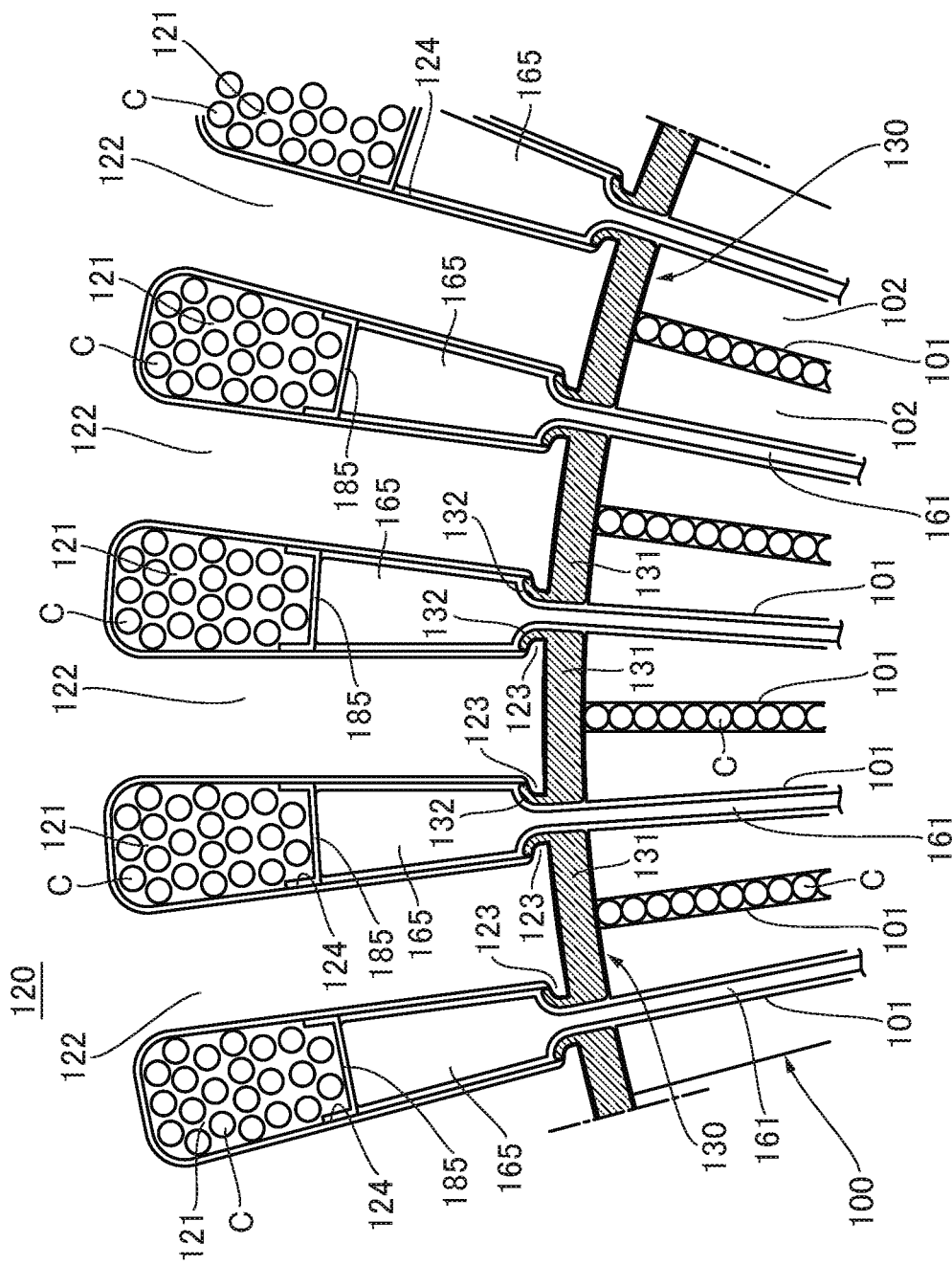
FIG. 14 is a partial enlarged explanatory view showing a state in which one side of the coils has been inserted into the outer radial side of the slots of the stator core, a slot interphase insulation paper has been inserted into the slots, and one side of the coils has been moved to the outer radial side of the slots by the coil insertion device of the present invention.

Thus, FIGS. 13 and 14 show a state in which one side part of the coils C held in the holding grooves 101 of the transfer block 100, which has been aligned and arranged to the slots 121 of the stator core 120, has been inserted into the slots 121. In this embodiment, the coils C are inserted in two stages in the outer radial side and the inner radial side of the slots 121, and in the state shown in FIGS. 13 and 14, the coils C are inserted in the outer radial side of the slots 121.

A slot interphase insulation sheet 185 is inserted into the slots 121, as shown in FIG. 14, in synchronization with the insertion of one side part of the coils C into the slots 121. The slot interphase insulation sheet 185 can be inserted by a device similar to a later-described slot entrance insulation sheet insertion device 190. The slot interphase insulation sheet 185 has the long narrow plate shape, both side parts thereof are bent to the outer radial side to have a C shape as viewed from the axial direction of the slots 121.

When the blades 161 shown in FIG. 10 are further pressed inward, the thick part 165 of the blades 161 is inserted into the slots 121 of the stator core 120, as shown in FIG. 14, and one side part of the coils C is pressed inward to the outer radial side of the slots 121 via the slot interphase insulation sheet 185. This makes it easier to insert the other side part of the coil C into the inner radial side of the slot in later step. Thus, the one side part of the coils C is inserted into the slots 121, after which the blades 161 of the pusher 160 are pulled out from the holding grooves 101 of the transfer block 100 and the slots 121 of the stator core 120.

Figure 15:
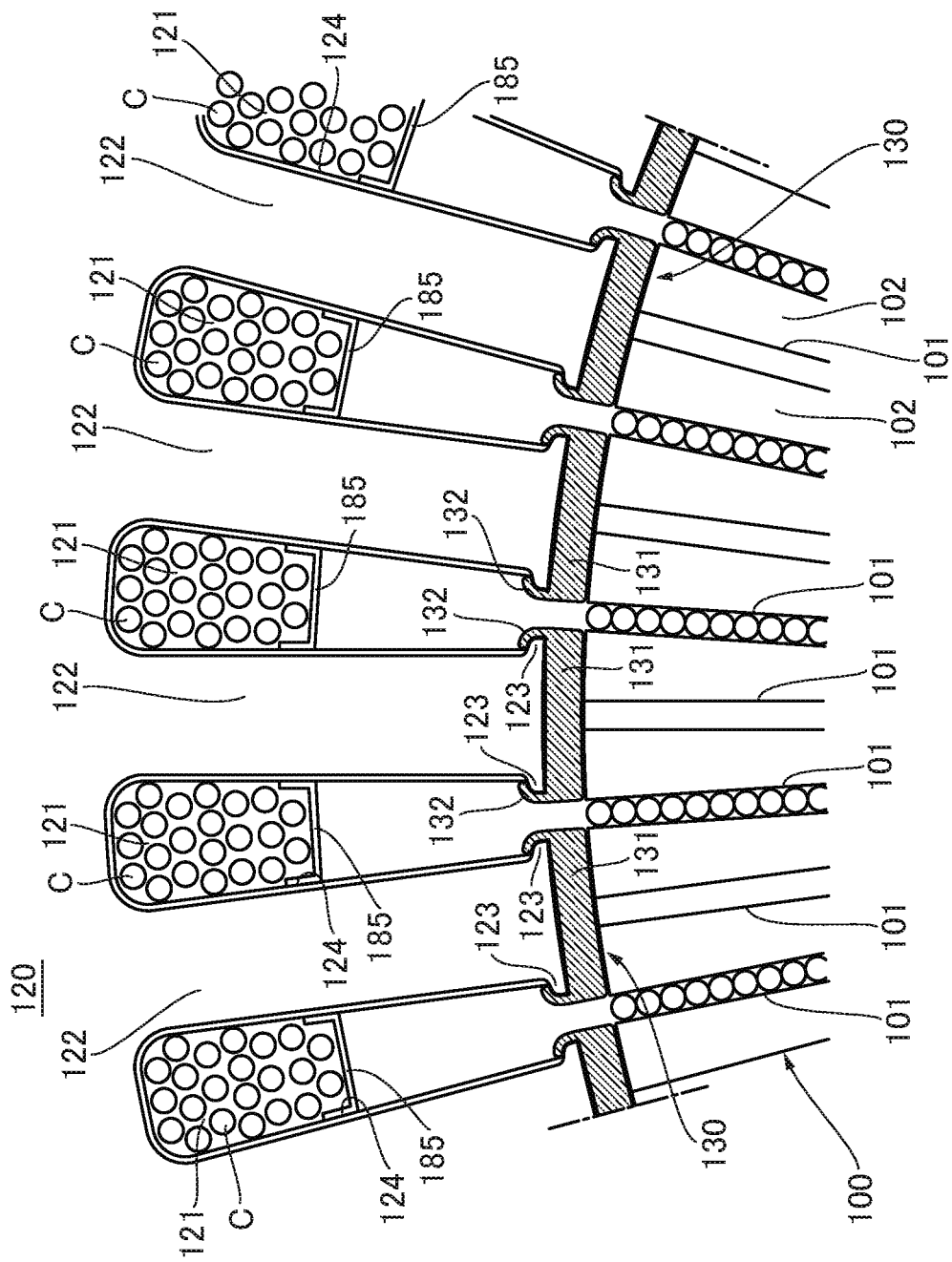
FIG. 15 is a partial enlarged explanatory view showing a state in which the pusher has been pulled out, the interphase insulation paper has been inserted into the slots of the stator core in which one side of the coils has been inserted, the transfer block has been rotated with respect to the stator core, and the holding grooves into which the other side of the coils of the transfer block has been inserted have been aligned with the corresponding slots in the stator core.

As shown in FIG. 15, the transfer block 100 rotates an angle equivalent to half the array interval of the slots 121, and the holding grooves 101, whose opening part had heretofore been blocked by the cover body 131 of the cover members 130, are arranged in a position aligned with the slots 121. In this case and in this embodiment, the angle between the holding grooves 101 into which both side parts of the coils C have been inserted is an angle of over ½ the array interval of the slots 121 of the stator core 120 with respect to the insertion angle into the corresponding slots 121 of the stator core 120, and the transfer block 100 is therefore relatively rotated, with respect to the stator core 120, toward the direction of the grooves into which one side of the coils C has been inserted, at an angle of half the array interval of the slots 121, whereby the holding grooves 101 into which the other side of the coils has been inserted is aligned with the corresponding slots 121. As a result, the coil ends of one side of the coils C already inserted becomes loose. A later-described coil-end interphase insulation sheet 308 (see FIGS. 27 to 31) can thereby be readily inserted in between different phases of the coil ends.

In this state, the distal end part of the blades of the pusher for inserting the other end of the coils C is inserted into the holding grooves 101 from one end face side of the transfer block 100. The pusher for inserting the other side of the coils C has a shape obtained by removing the thick part 165 from the blades 161 of the pusher 160 used for inserting the one side of the coils C, and since the basic shape is the same, a description thereof is omitted. The other side part of the coils C held in the holding grooves 101 is pressed by the coil pressing part 166 of the blades 161 and inserted into the slots 121 by way of a gap between the teeth 122 covered by the cover members 130. At this time as well, the distal end part of the teeth 122 is covered by the cover members 130, whereby the coils C do not come into direct contact with the teeth 122, and damage to the coils C can thereby be prevented.

Figure 16:
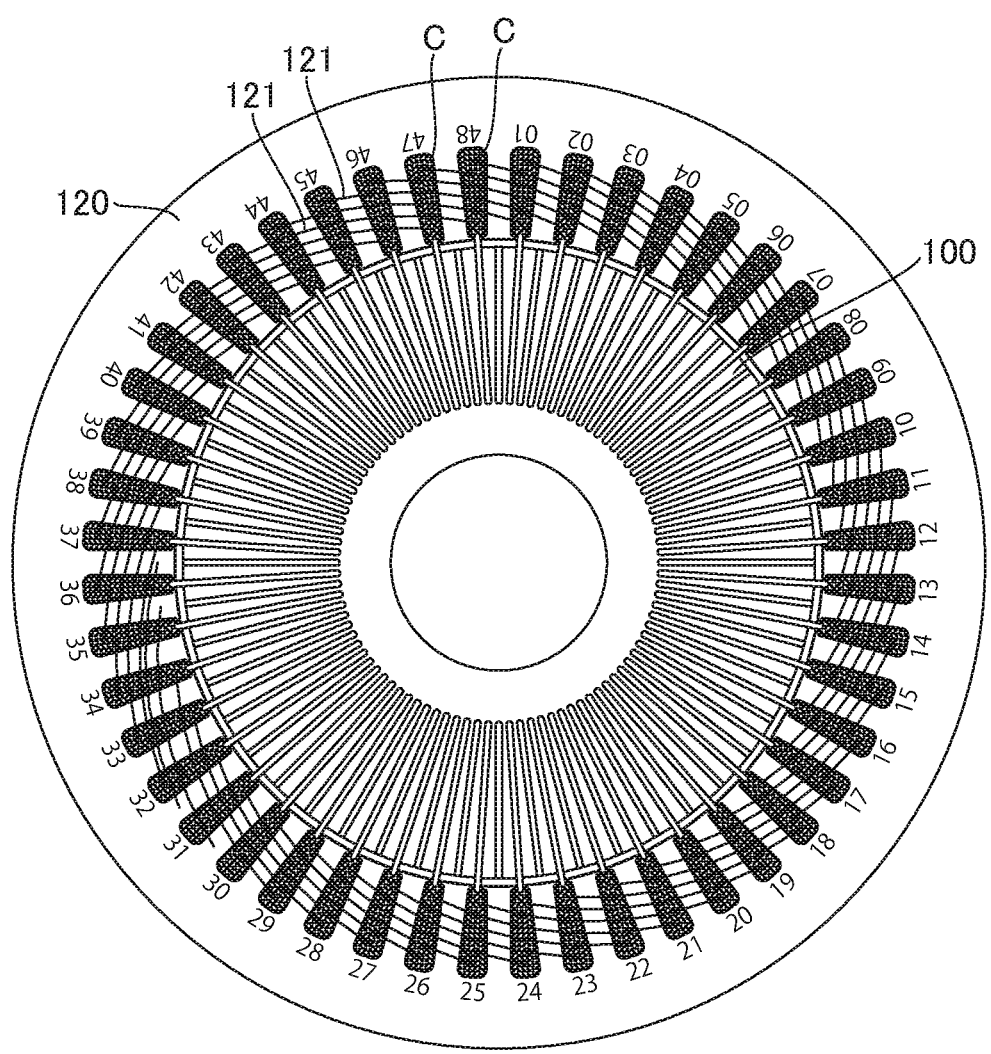
FIG. 16 is an explanatory view showing a state in which the coils have been inserted into the inner radial side of the slots of the stator core by the coil insertion device of the present invention.
Figure 17:
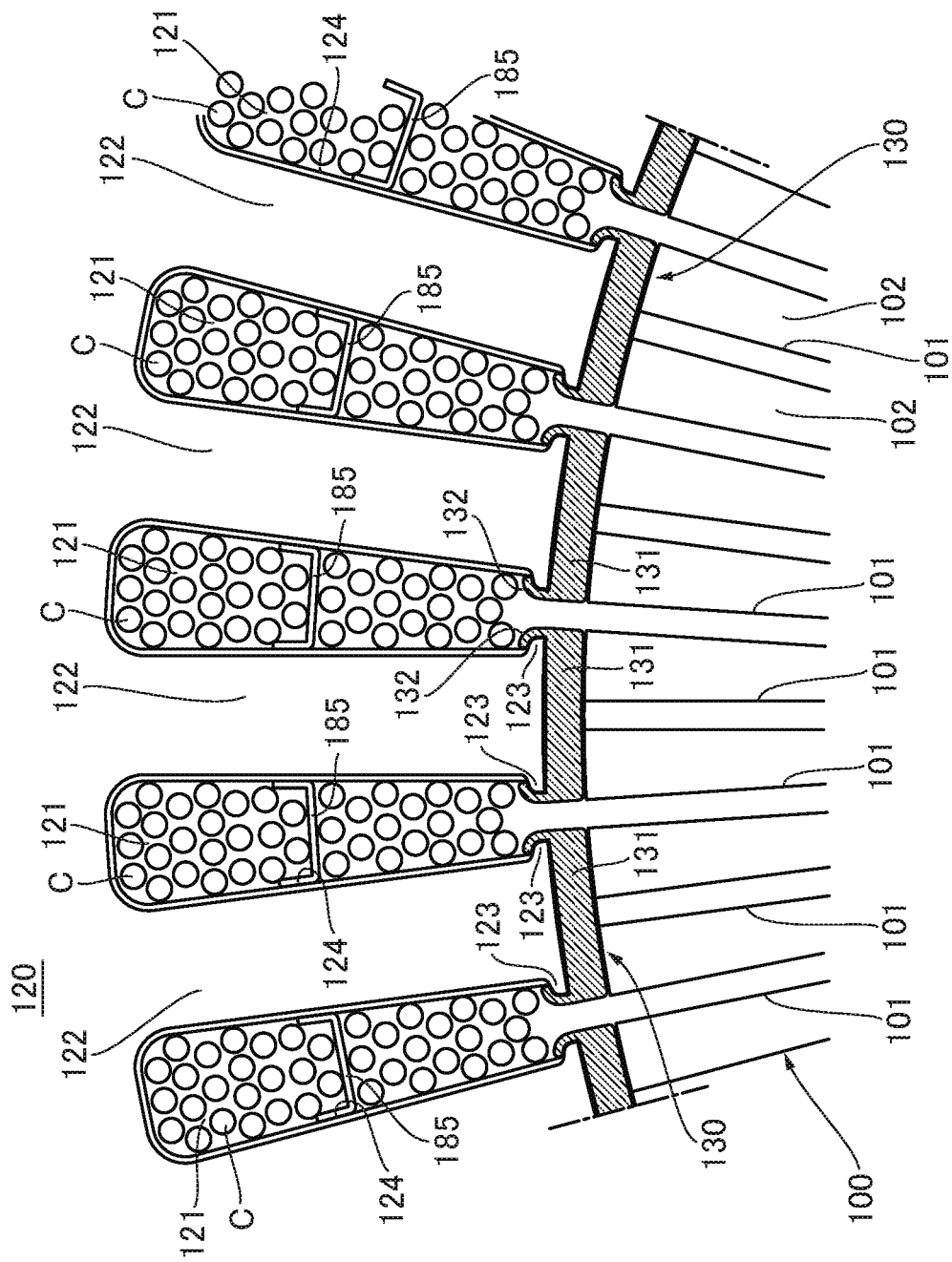
FIG. 17 is a partial enlarged explanatory view showing a state in which the coils have been inserted into the inner radial side of the slots of the stator core by the coil insertion device of the present invention.

Thus, FIGS. 16 and 17 show a state in which all the coils C held in the holding grooves 101 of the transfer block 100 have been inserted into the slots 121 of the stator core 120. The coils C of the outer radial side and the coils C of the inner radial side inserted into a single slot 121 are different phase coils C and are therefore separated by the slot interphase insulation sheet 185.

The coils C are inserted into the holding grooves 101 of the transfer block 100 by the above-described method using the winding and insertion device 110 shown in FIG. 2, whereby the coils C are held in a state already spirally overlapping on the transfer block 100. Inserting the coils C into the slots 121 of the stator core 120 with the above-described method makes it possible to insert the coils C in a spirally overlapping state into the slots 121 of the stator core 120, shorten the coil ends, and increase the efficiency of a motor or the like.

The coils C of the outer radial side and the coils C of the inner radial side inserted into the slots 121 are offset by one slot each in the peripheral direction, and the coils C of the outer radial side and the coils C of the inner radial side inserted into a single slot 121 are arranged to as to be different-phase coils C, whereby the rotation of the motor or the like can be made smooth.

Thus, in accordance with the present invention, a spirally wound stator core that can make rotation smooth can be mechanically manufactured with good efficiency, whereby the efficiency of a motor, etc., can be increased.

In this manner, one side of the coils C is inserted into the outer radial side of the slots 121 of the stator core 120, the other side of the coils C is inserted into the inner radial side of the slots 121 of the stator core 120, and in the present invention, a coil-end interphase insulation sheet insertion device is provided for arranging a coil-end interphase insulation sheet on the inner side of the coil ends of the one side of the coils that protrudes from the end face of the stator core 120 prior to the other side of the coils C being inserted into the corresponding slots 121, and sandwiching the coil-end interphase insulation sheet between the coil ends of different phases when the other end of the coils is inserted. The coil-end interphase insulation sheet insertion device will be described with reference to FIGS. 27 to 31.

Figure 27:
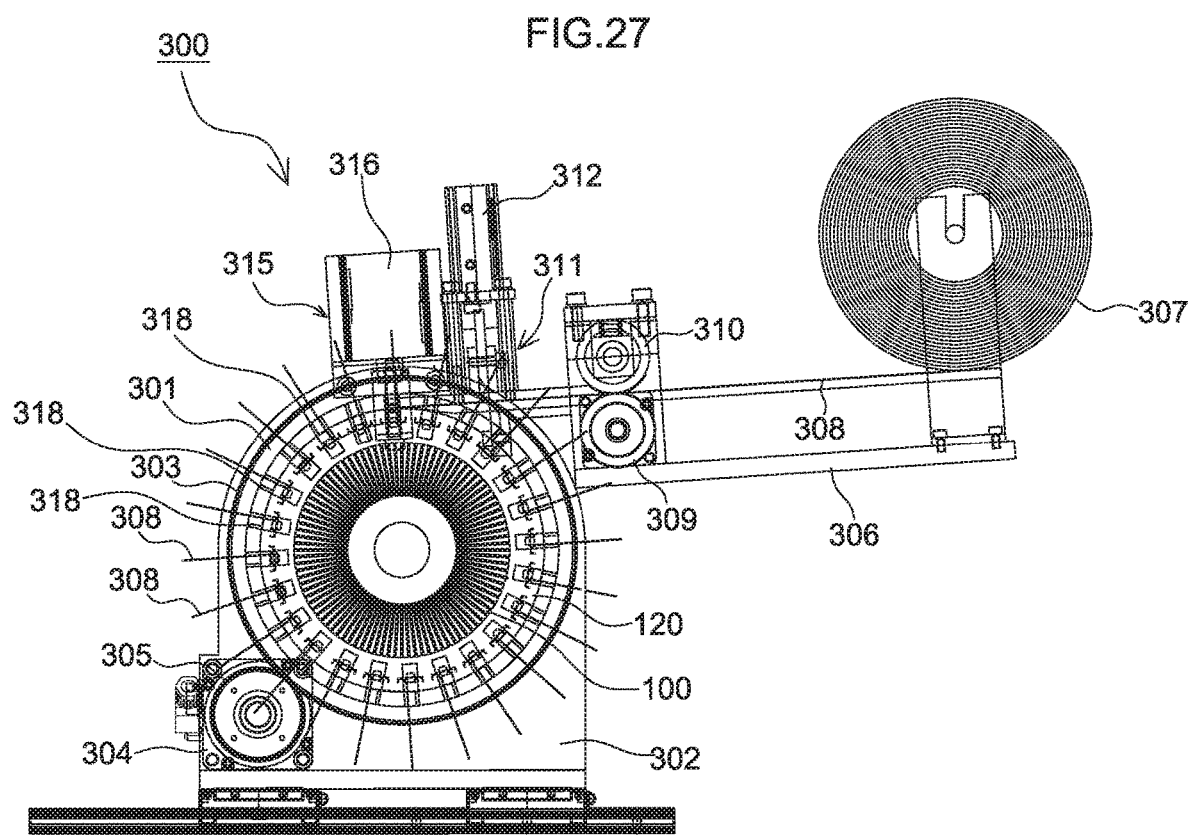
FIG. 27 is a front view showing a coil-end interphase insulation sheet insertion device used in the present invention.
Figure 28:
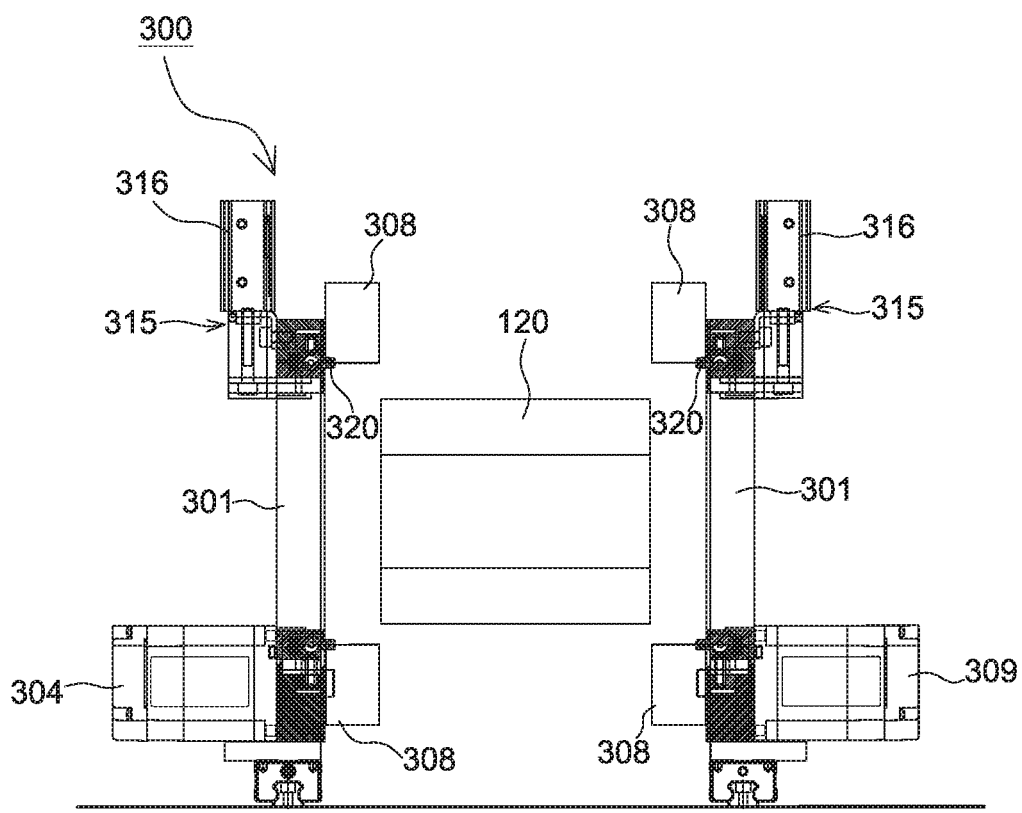
FIG. 28 is a lateral view of the coil-end interphase insulation sheet insertion device.

As shown in FIGS. 27 and 28, the coil-end interphase insulation sheet insertion device 300 has a pair of annular holders 301 concentrically arranged in proximity to the both end faces of the stator core 120. The annular holders 301 are rotatably supported by a support frame 302 (see FIG. 27) and have an outer peripheral gear 303. A motor 304 is installed in the support frame 302, a drive gear 305 thereof meshes with the outer peripheral gear 303 of the annular holders 301, and the annular holders 301 can rotate by the actuation of the motor 304.

A support plate 306 extends from the support frame 302, and a reel 307 of the coil-end interphase insulation sheet 308 is supported by the support plate 306. The coil-end interphase insulation sheet 308 drawn out from the reel 307 is held between feed rollers 309, 310 and is fed out at predetermined timing in the direction of the annular holders 301 by at least one of the feed rollers 309, 310 being rotated by a drive motor (not shown).

Figure 29:
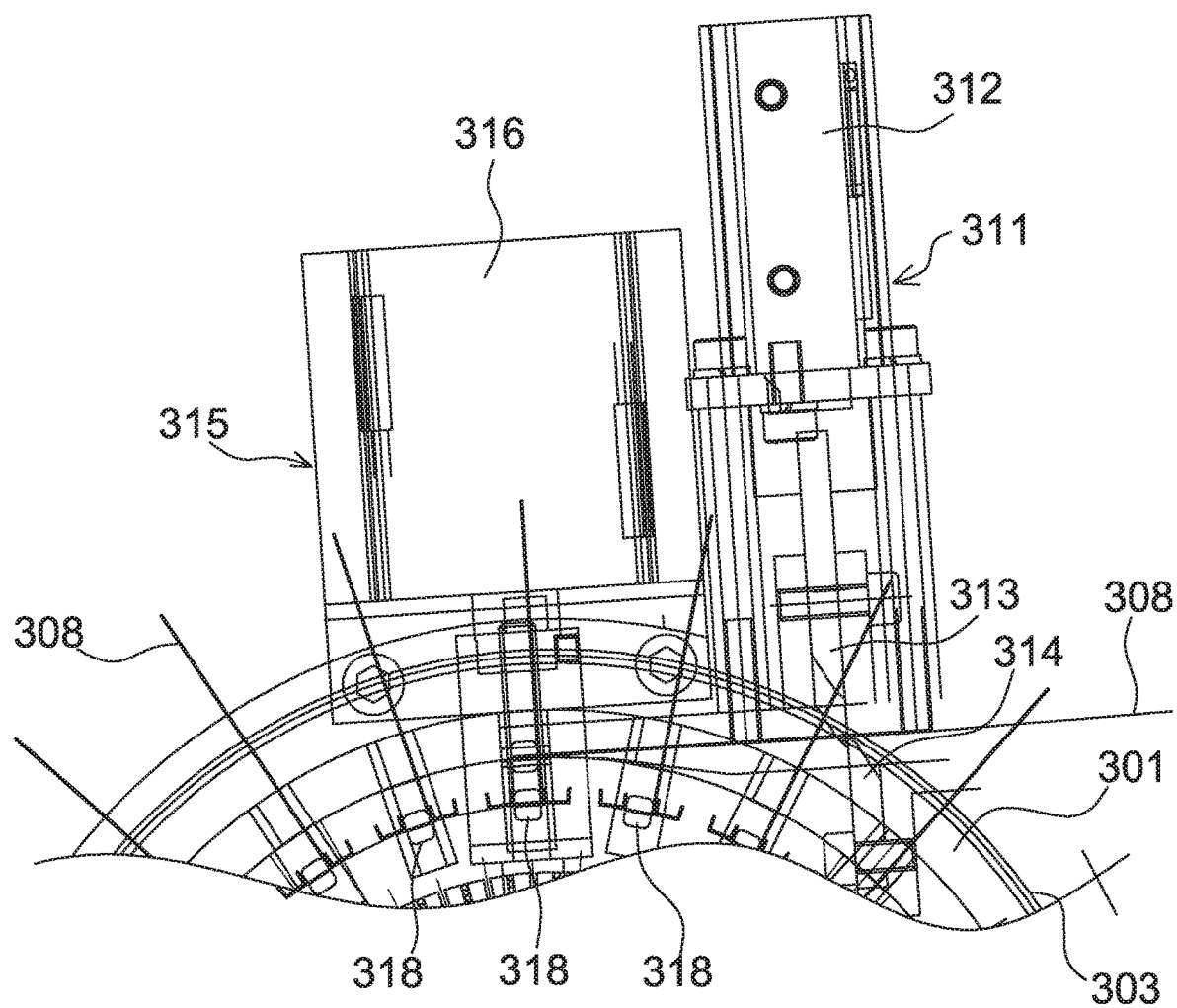
FIG. 29 is a partial enlarged explanatory showing the cutter and clamp open/close device of the coil-end interphase insulation sheet insertion device.

A cutter 311 and a clamp open/close device 315 are arranged in the feed-out direction of the coil-end interphase insulation sheet 308. As shown in FIG. 29, the cutter 311 has a movable blade 313 that is advanced/retracted by a cylinder 312, and a fixed blade 314 that slides in contact with the movable blade 313 when the movable blade 313 has protruded out, and cuts the coil-end interphase insulation sheet 308.

Figure 30:
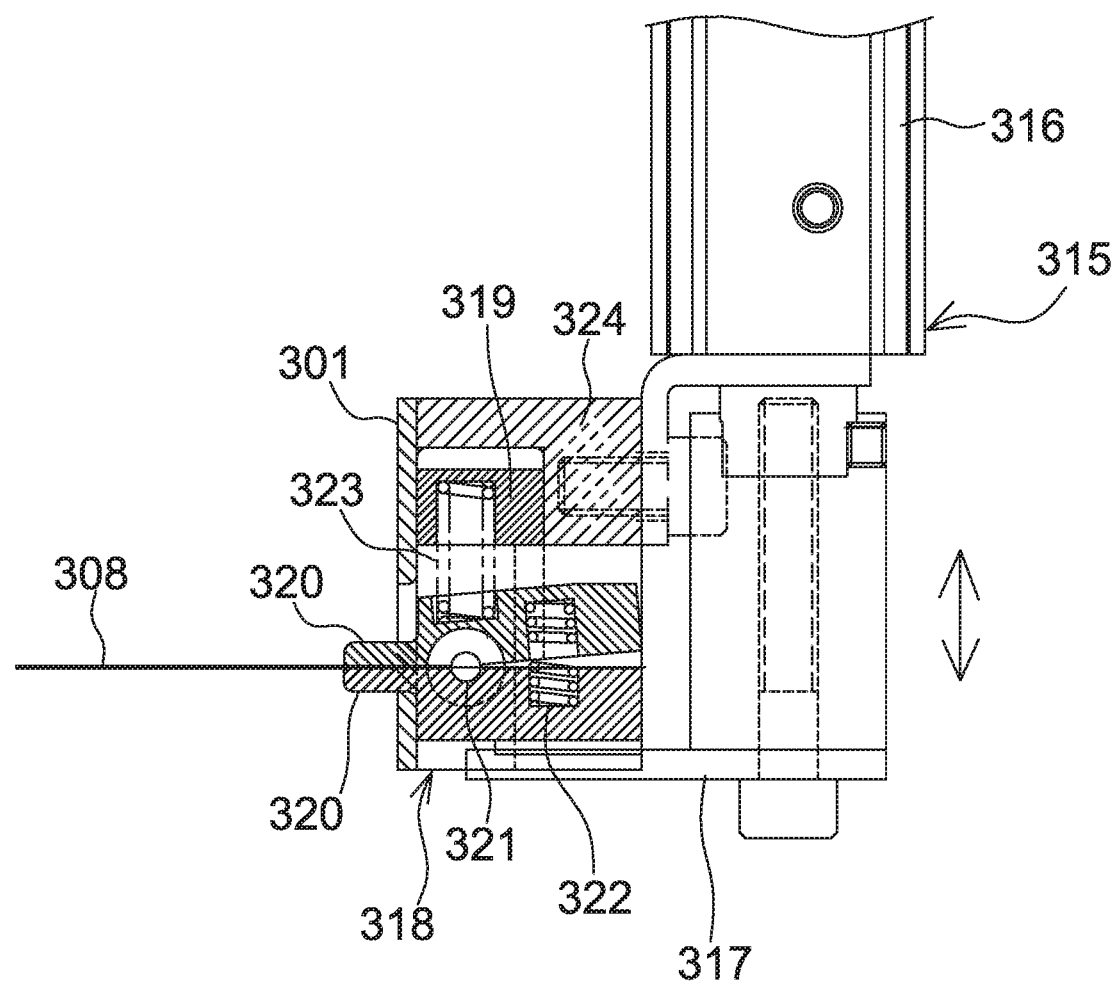
FIG. 30 is a partial enlarged explanatory view showing a state in which the clamp has been closed in the clamp open/close device of the coil-end interphase insulation sheet insertion device.

A clamp unit 318 is attached to the annular holders 301 at a predetermined angular interval. As shown in FIG. 30, the clamp unit 318 has a bracket 319 attached to the annular holder 301, and a pair of clamp bodies 320 is openably/closeably attached to the bracket 319 via a spindle 321. A first spring 322 is disposed between the base end parts of the clamp bodies 320 to constantly urge a clamp part at the distal end of the clamp bodies 320 in the closing direction.

The clamp bodies 320 are slidably held inside the bracket 319 a predetermined distance in the radial direction of the annular holders 301. The clamp bodies are constantly urged by a second spring 323 mounted inside the bracket 319 so as to move in the inner radial direction of the annular holders 301.

The clamp open/close device 315 is attached to the support frame 302 (see FIG. 27) and is used for opening and closing each clamp unit 318 that moves by the rotation of the annular holders 301. The clamp open/close device 315 has an air cylinder 316, an actuation plate 317 that advances/retracts in the radial direction of the annular holder 301 by actuation of the air cylinder 316, and a guide part 324 that receives the clamp unit 318.

Figure 31:
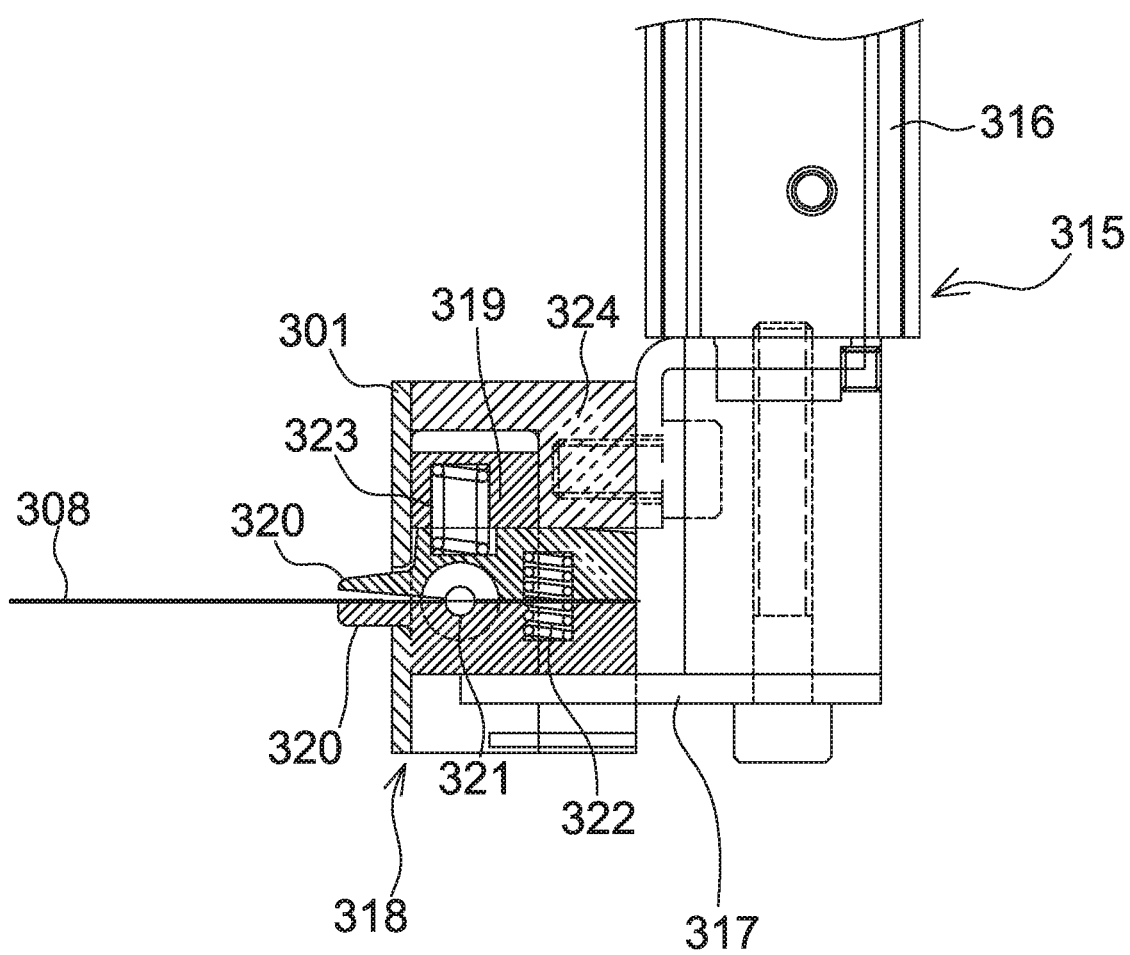
FIG. 31 is a partial enlarged explanatory view showing a state in which the clamp has been opened in the clamp open/close device of the coil-end interphase insulation sheet insertion device.

FIG. 30 shows a state in which one clamp unit 318 has been introduced into the guide part 324 of the clamp open/close device 315 by the rotation of the annular holders 301. In this state, an actuation rod of the air cylinder 316 is drawn inward, the actuation plate 317 moves in the outer radial direction of the annular holders 301, whereupon the clamp bodies 320 move in the outer radial direction against the urging force of the second spring 323. At this time, as shown in FIG. 31, the base end part of the clamp bodies 320 makes contact with the guide 324, and the base end part closes against the urging force of the first spring 322 to achieve a state in which the clamp part of the clamp bodies 320 is opened.

In this state, the coil-end interphase insulation sheet 308 is fed out and inserted into the open clamp part of the clamp bodies 320. Next, the air cylinder 316 actuates again and the actuation plate 317 moves in the inner radial direction of the annular holders 301, whereupon the clamp part of the clamp bodies 320 closes due to the urging force of the first spring 322, as shown in FIG. 30, and the coil-end interphase insulation sheet 308 is held by the clamp bodies 320. Moreover, the clamp bodies 320 move in the inner radial direction of the annular holders 301 under the urging force of the second spring 323. As a result, the coil-end interphase insulation sheet 308 held by the clamp bodies 320 is arranged on the inner side of the coil end of the one side of the coils C inserted earlier into the slots 121 of the stator core 120. The coil-end interphase insulation sheet 308 is held between the clamp bodies 320, then cut to a predetermined length by the above-described cutter 311, and held in strip shape by the clamp bodies 320. Thereafter, the annular holders 301 rotate and the next clamp unit 318 is introduced into the guide part 324 of the clamp open/close device 315. The operation is repeated, whereby the coil-end interphase insulation sheet 308 cut in a strip shape is held by the clamp bodies 320 of all the clamp units 318.

In this state, when the annular holders 301 are turned at a predetermined angle while the other side of the coils C is inserted into the predetermined slots 121 of the stator core 120, the coil-end interphase insulation sheet 308 held by the clamp bodies 320 is pulled into and held between the coil ends of the one side of the coils C already inserted, and the coil ends of the other side of coils C. Thus, the coil-end interphase insulation sheet 308 can be sandwiched between different-phase coil ends.

As described above, in this embodiment, the angle between the holding grooves 101 of the transfer block 100 into which both side parts of the coils C have been inserted is over ½ the array interval of the slots 121 of the stator core 120 with respect to the insertion angle into the corresponding slots 121 of the stator core 120, and the transfer block 100 can therefore be relatively rotated, in relation to the stator core 120, in the direction of the grooves into which the one side of the coils C has been inserted, at an angle half that of the array interval of the slots 121. As a result, the coil ends of one side of the coils C already inserted become loose, and therefore, when the other side of the coils C is inserted into the predetermined slots 121, the coil-end interphase insulation sheet 308 can be readily inserted between different phases of the coil ends.

Figure 18:
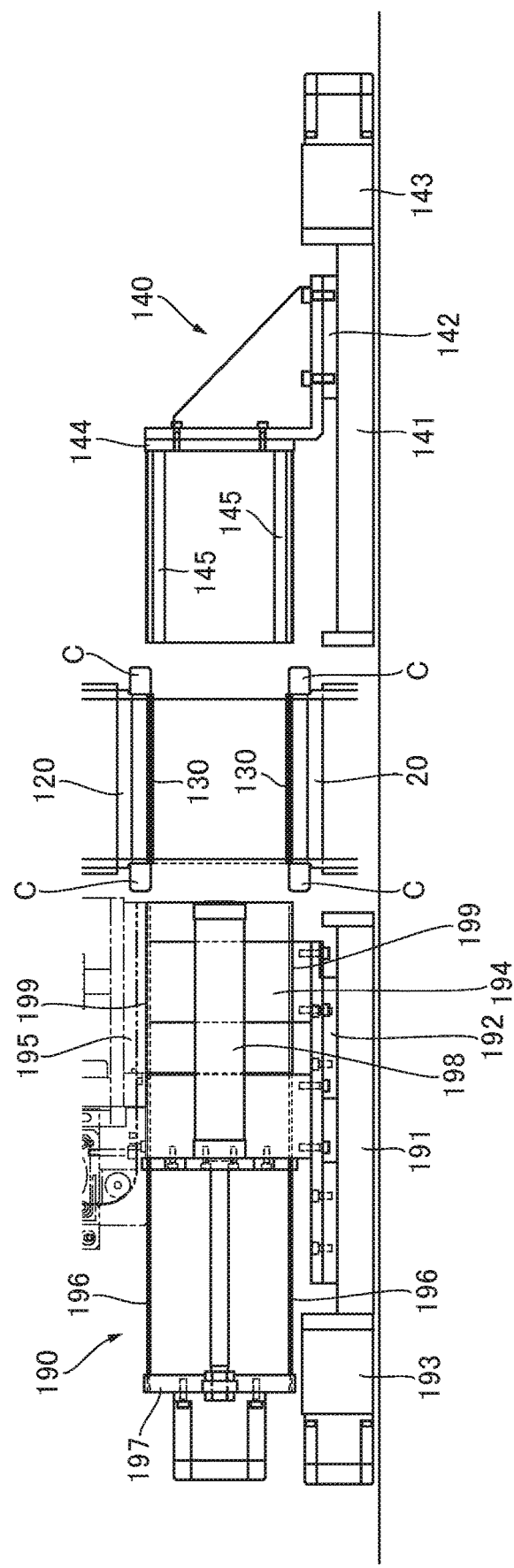
FIG. 18 is an explanatory view showing a cover attaching/detaching device for removing the cover member from the stator core with coils inserted, a slot entrance insulation sheet insertion device for inserting a slot entrance insulation sheet (wedge) into the inner periphery of the opening part of the slots in the stator core, and a state in which the cover member is still mounted on the distal end of the teeth of the stator core.
Figure 19:
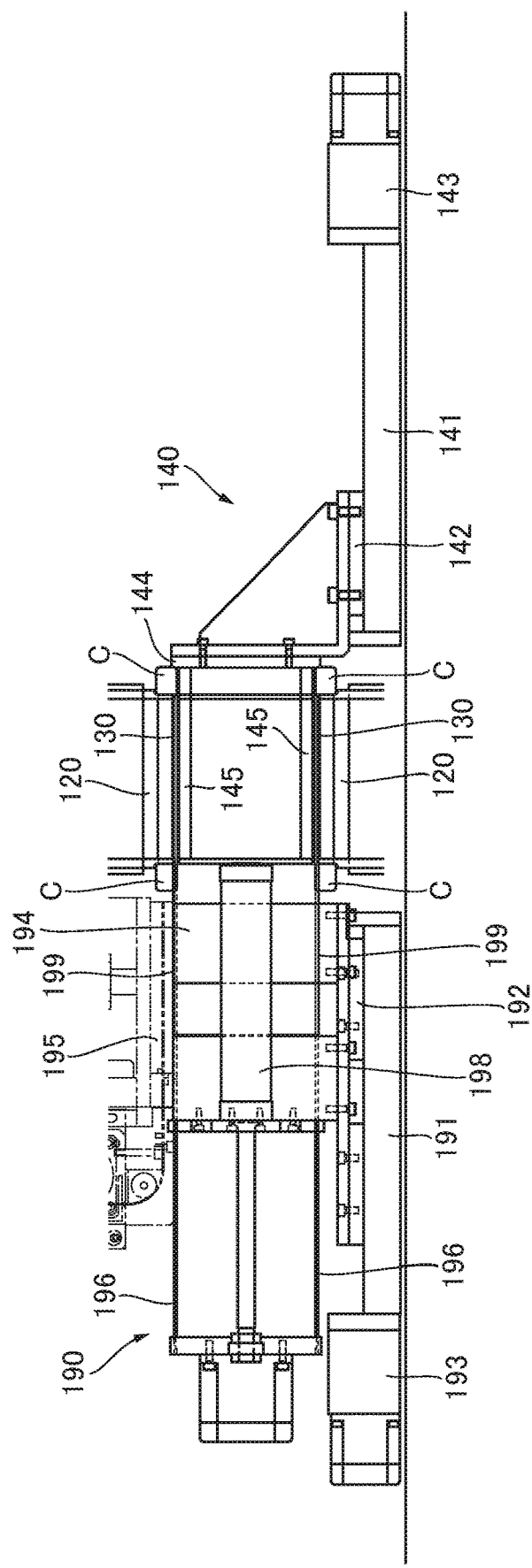
FIG. 19 is an explanatory view showing a state in which, in the same device, a holder of the cover member attaching/detaching device has been inserted into the inner periphery of the stator core from one end face side of the stator core and fit onto the cover member.
Figure 20:
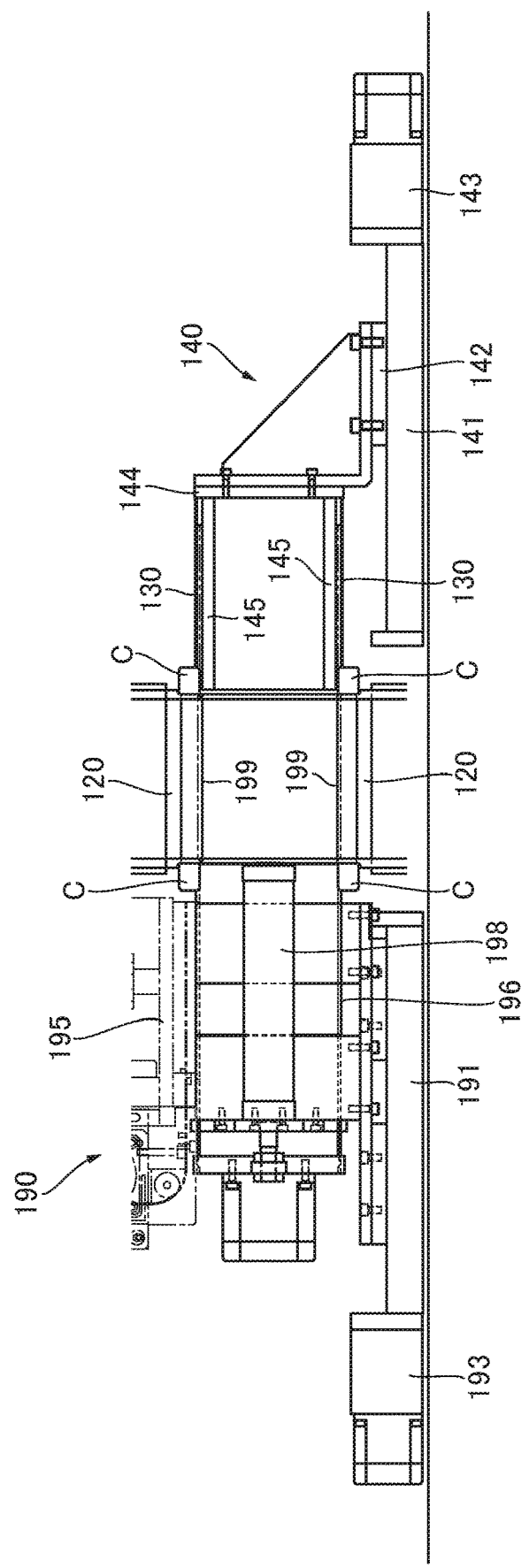
FIG. 20 is an explanatory view showing a state in which, in the same device, the cover member is removed from the teeth of the stator core by the cover member attaching/detaching device, and the slot entrance insulation sheet (wedge) is inserted into the inner periphery of the opening part of the slots in the stator core.

FIGS. 18 to 20 show the slot entrance insulation sheet insertion device 190 that actuates in coordination with the above-described cover member attaching/detaching device 140. The slot entrance insulation sheet insertion device 190 has a base 191 in which a ball screw (not shown) is housed, a slide block 192 capable of threadably engaging and moving the base 191, and a second servomotor drive device 193 for rotating the ball screw and moving the slide block 192 along the base 191. A wedge magazine 194 is installed on the slide block 192, and a plurality of slots (not shown) is formed in the outer periphery of the wedge magazine 194 so as to align with the slots 121 of the stator core 120 at predetermined intervals in the peripheral direction. Moreover, a punch 195 for inserting a slot entrance insulation sheet 199 into the slots of the wedge magazine 194 is provided to a lateral area of the wedge magazine 194. Furthermore, wedge pushers 196 for pushing out the slot entrance insulation sheet 199 inserted into the slots (not shown) of the wedge magazine 194 and inserting the slot entrance insulation sheet into the slots 121 from the other end face side of the stator core 120 are annularly arrayed behind the wedge magazine 194 and are held by a holder 197. The holder 197 is connected to an actuation rod of a second air cylinder 198 and is advanced and retracted by the second air cylinder 198. The slot entrance insulation sheet insertion device 190 has a structure similar that which is installed in a general coil insertion device, and a detailed description thereof is omitted.

In FIG. 18, a configuration in which the transfer block 100 has been removed from the stator core 120 in the state shown in FIGS. 16 and 17 is installed in the center of the slot entrance insulation sheet insertion device 190 with the axial direction of the configuration oriented in the horizontal direction. The cover member attaching/detaching device 140 described above is arranged in a position slightly separated from one end face of the stator core 120 so that the distal end of the holder 145 aligns with the corresponding slots 121 of the stator core 120. The slot entrance insulation sheet 199 held in the slots of the wedge magazine 194 of the slot entrance insulation sheet insertion device 190 is arranged in a position slightly separated from the other end face of the stator core 120 so as to align with the slots 121 of the stator core 120.

In this state, the first servomotor drive device 143 of the cover member attaching/detaching device 140 is actuated, and the holder 145 is inserted from one end face side of the stator core 120, as shown in FIG. 19. At this time, the cover member 130 to which the holder 145 corresponds is received and arranged in the inner periphery of the stator core 120. As shown in FIG. 5, the cam member 149 is advanced, and the cam follower 150 is turned so that the bottom face of the cam follower 150 makes contact with the front slope face 149a and the flat face 149b, whereupon the stopper pin 152 engages the stopper hole 133, and the cover member 130 becomes connected to the holder 145. In relation to the slot entrance insulation sheet insertion device 190, the second servomotor drive device 193 actuates and the slide block 192 advances, and the distal end of the wedge magazine 194 moves to a position near the other end face of the stator core 120.

Next, the slide block 142 and the support plate 144 retract by the actuation of the first servomotor drive device 143 of the cover member attaching/detaching device 140, as shown in FIG. 20, and the cover member 130 held by the holder 145 is removed from the slot 121 of the stator core 120 together with the holder 145. Moreover, the second air cylinder 198 actuates, the wedge pushers 196 are inserted into the slot (not shown) of the wedge magazine 194, the slot entrance insulation sheet 199 held in the slot is pushed out and inserted into the slot 121 from the other end face side of the stator core 120. In this case, insertion of the slot entrance insulation sheet 199 into the slot 121 can be carried out in synchronization with removal of the cover member 130 from the slot 121, and since the slot entrance insulation sheet 199 is inserted into the space from which the cover member 130 has been removed, insertion of the slot entrance insulation sheet 199 can be smoothly carried out.

Figure 21:
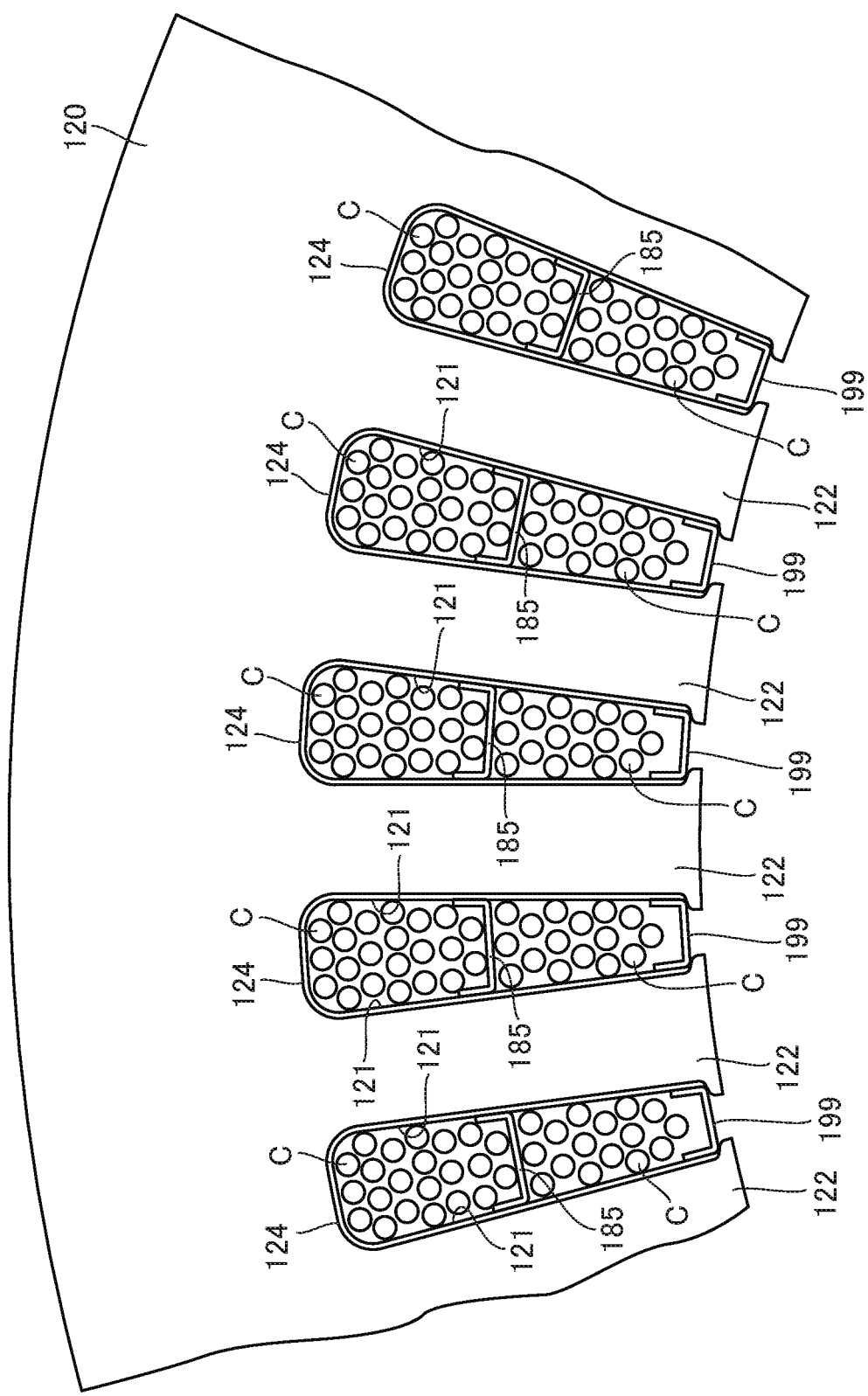
FIG. 21 is partial enlarged explanatory view of the stator core obtained by the coil insertion device of the present invention.

Thus, FIG. 21 shows a state in which slot entrance insulation sheet 199 has been inserted into the slots 121 of the stator core 120. The cover members 130 are removed from the distal end part of the teeth 122, the slot entrance insulation sheet 199 is inserted into the inner side of the opening part of the slots 121, and the coils C are prevented from flowing out from the opening parts of the slots 121. Thus, coils C of different phases are inserted into the outer radial side and inner radial side of the slots 121, and a stator core 120 in which the coils C are mounted can be obtained in a state in which the coil ends of the coils C protruding from the end face of the stator core 120 are spirally overlapped.

A motor or other dynamo-electric machine manufactured by incorporating this stator core 120 has a compact shape in which the coil ends of the stator core 120 are spirally overlapping, the dynamo-electric machine has excellent performance, and rotation action can be smoothed.

In the embodiment described above, the coils C are inserted in two stages in the outer radial side and the inner radial side of a single slot 121 of the stator core 120, but the coil insertion device of the present invention may be a device that inserts the coils C into a single slot 121 of the stator core 120 in single stage.

Figure 24:
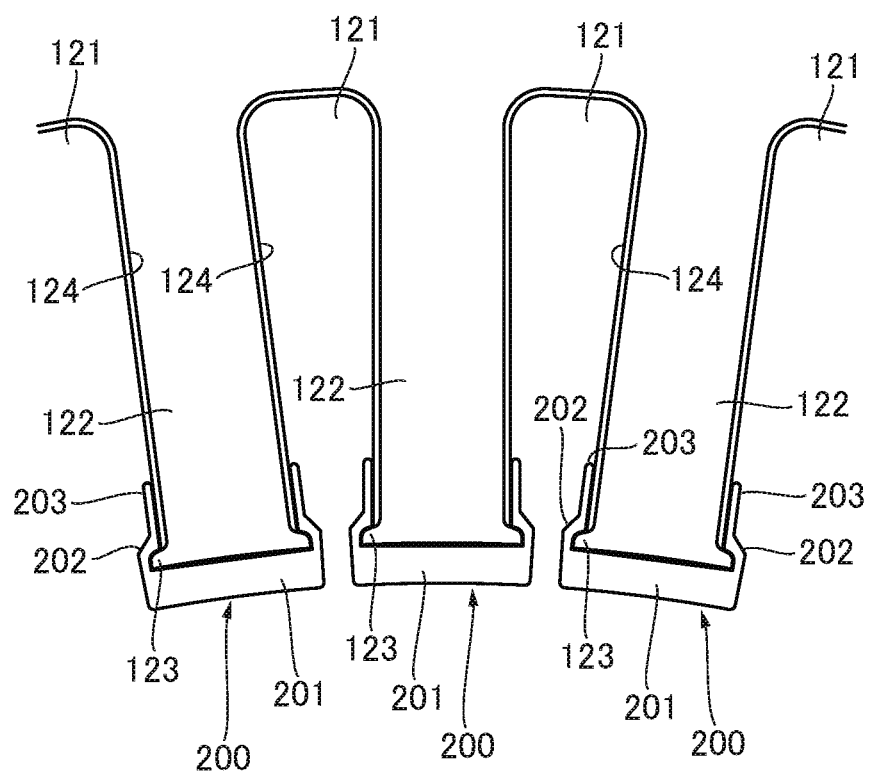
FIG. 24 is an end face view showing a second embodiment of the cover member used in of the present invention.
Figure 25:
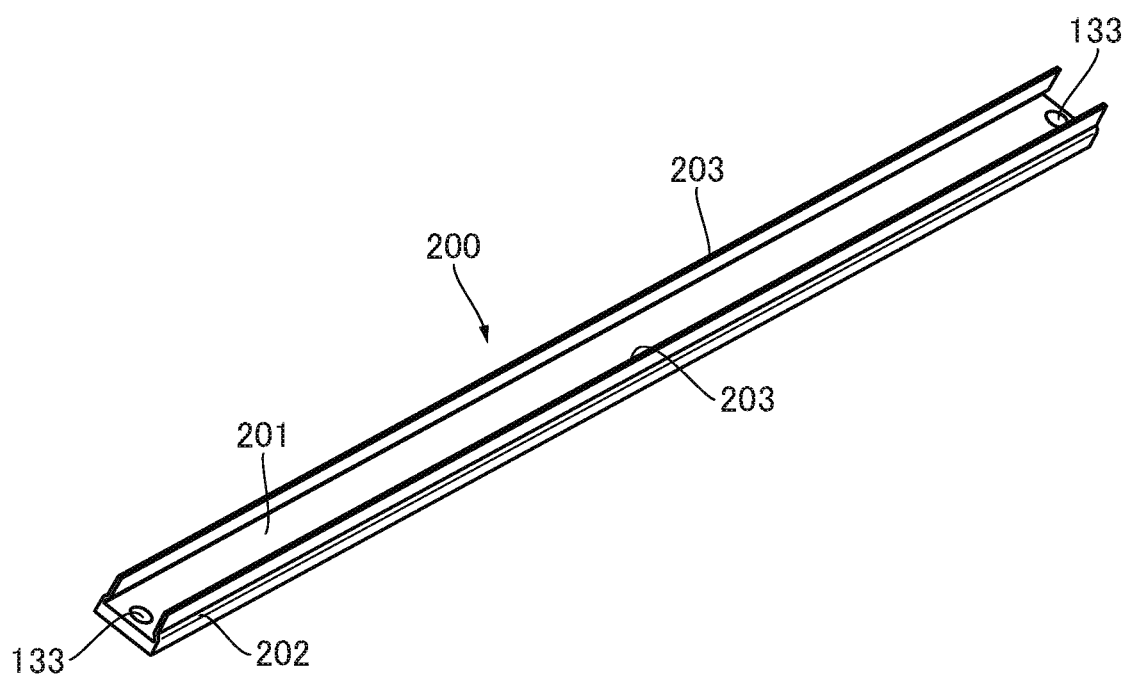
FIG. 25 is a perspective view showing a second embodiment of the cover member used in the present invention.

FIGS. 24 and 25 show another example of the cover members used in the coil insertion device of the present invention. The cover member 200 has a long, narrow rod shape overall, and is configured from a cover body 201 that makes contact with the protruding end face of the teeth 122, a rib cover 202 that extends from both sides of the cover body 201 in the outer radial direction and covers the diameter-expanding rib 123 of the teeth 122 of the stator core 120, and an extension part 203 that extends from the distal end of a rib cover 202 along the side face of the slots 121 side of the teeth 122. The stopper hole 133 is formed in the both end parts of the cover body 201 in the same manner as the cover member 130.

According to this cover member 200, providing the extension part 203 makes it possible to stably mount the cover member 200 on the teeth 122 of the stator core 120, and the slot entrance insulation sheet 199 can be more readily inserted when the cover member 200 is removed from the teeth 122 of the stator core 120 and the slot entrance insulation sheet 199 is inserted into the slots 121.

Next, an embodiment of the coil insertion method using the coil insertion device of the present invention will be described with reference to FIGS. 32 to 49. The structure and effect of each device has already been described, and a detailed description thereof will therefore be omitted. The winding step and the step for inserting coils into the transfer block are considered to have already been carried out by the method described above, and the sequence of subsequent steps will be described.

Figure 32:
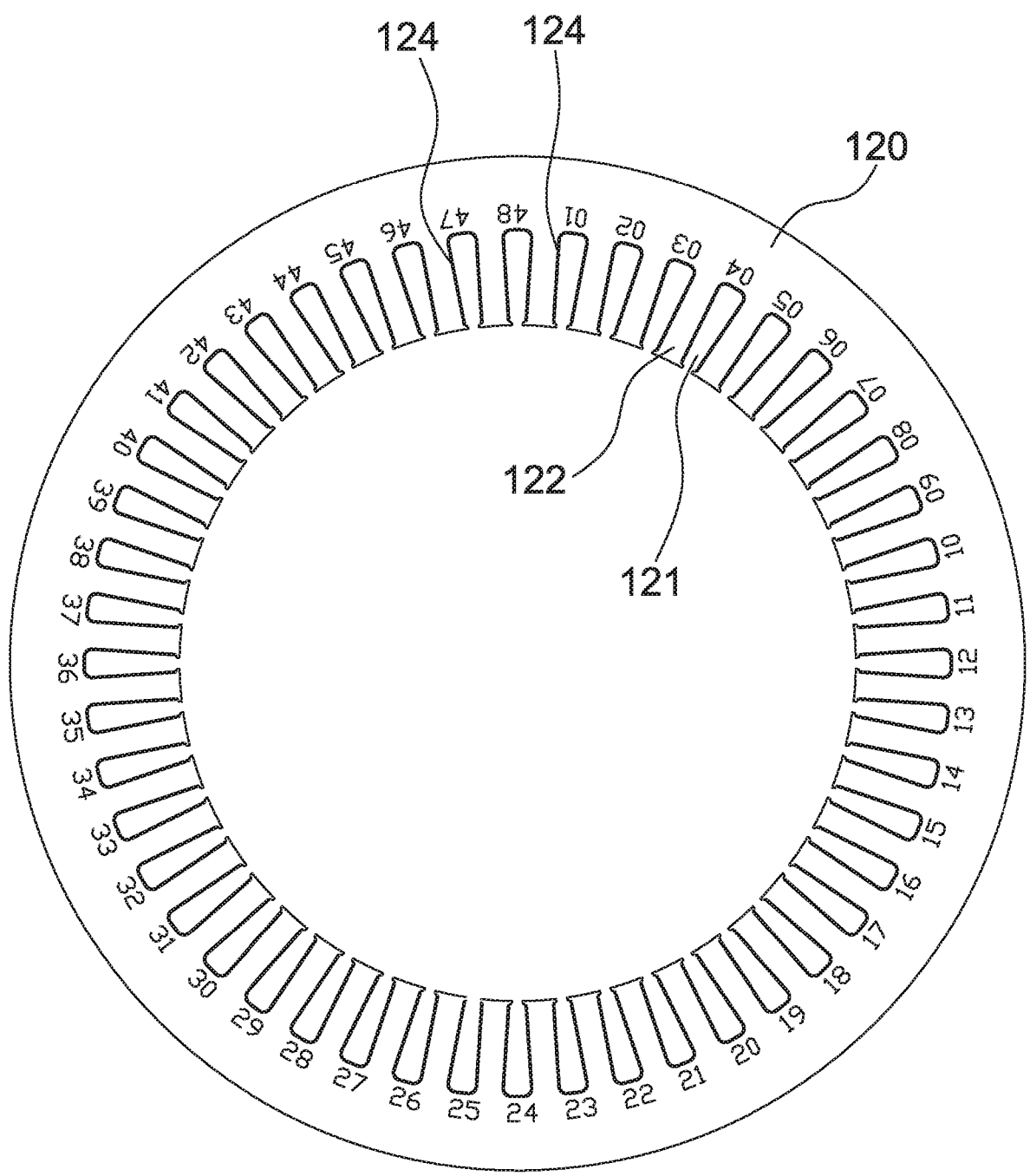
FIG. 32 is an explanatory view as seen from the end face side of the stator core, showing a state in which slot insulation sheets have been mounted on the inner periphery of the slots of the stator core.

FIG. 32 shows a state in which the slot insulation sheets 124 have been mounted on the inner periphery of the slots 121 of the stator core 120.

Figure 33:
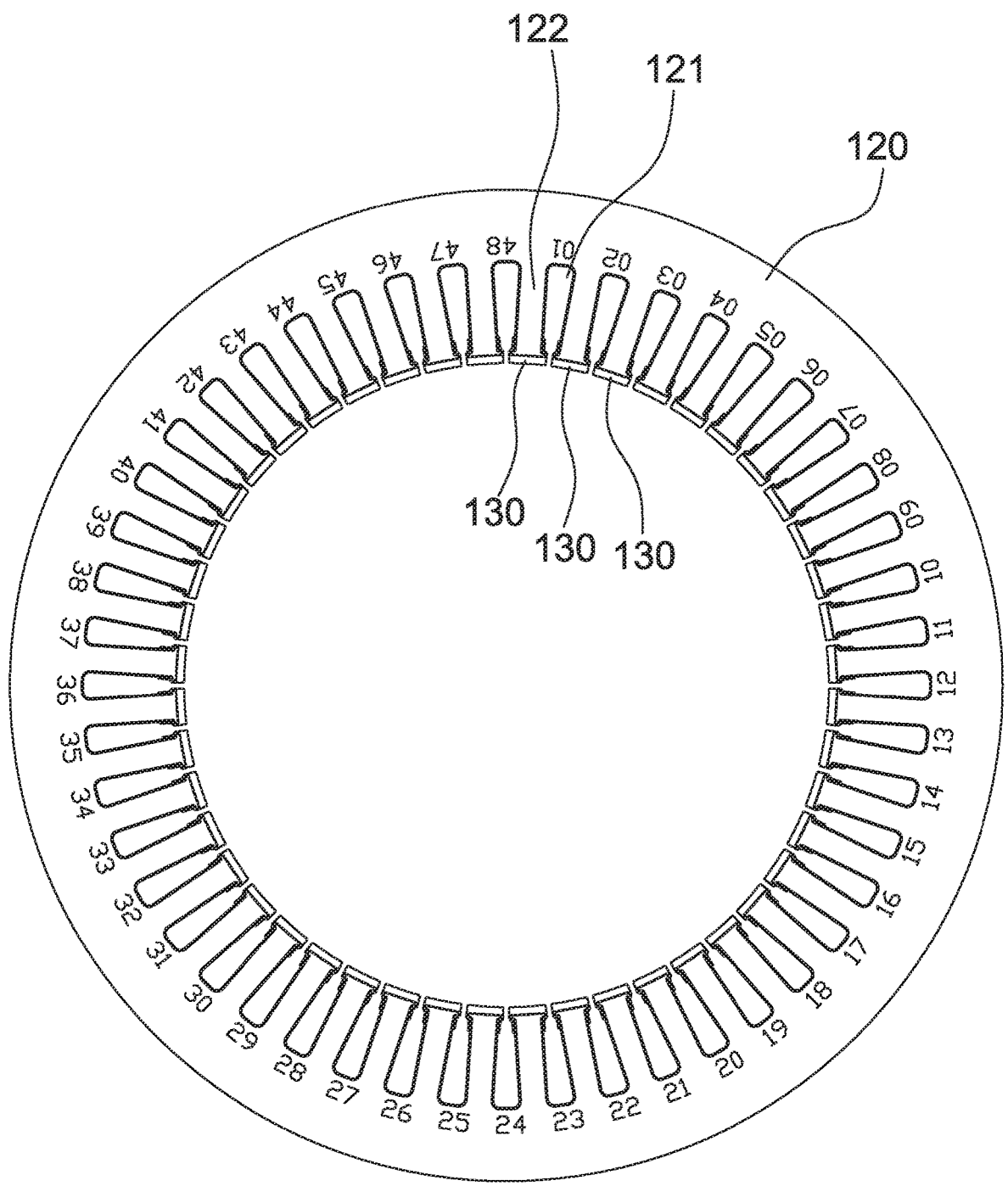
FIG. 33 is an explanatory view as seen from the end face side of the stator core, showing a state in which the cover members have been mounted on the end part of the teeth of the stator core.

FIG. 33 shows a state in which the cover members 130 are mounted on the distal end of the teeth 122 of the stator core 120. The cover members 130 are mounted by the above-described cover member attaching/detaching device 140 (FIGS. 5, 6, 7).

Figure 34:
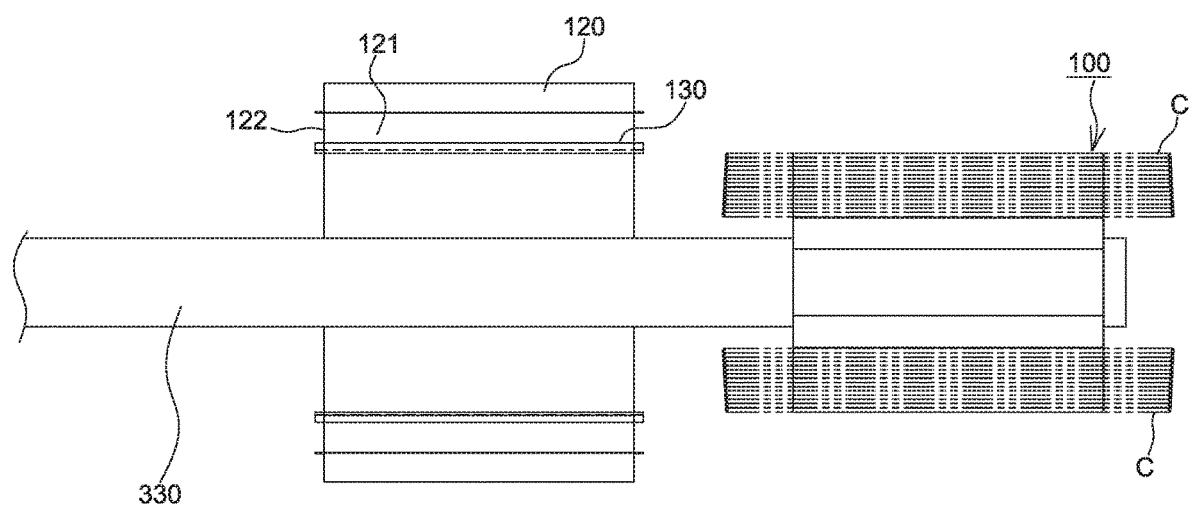
FIG. 34 is a lateral sectional view showing a state in which the transfer block with coils inserted is about to be inserted into the inner periphery of the stator core.

FIG. 34 is a lateral sectional view showing a state in which the transfer block 100 with coils C inserted is about to be inserted into the inner periphery of the stator core 120. The transfer block 100 is rotatably and moveably supported in the axial direction by a spindle 330.

Figure 35:
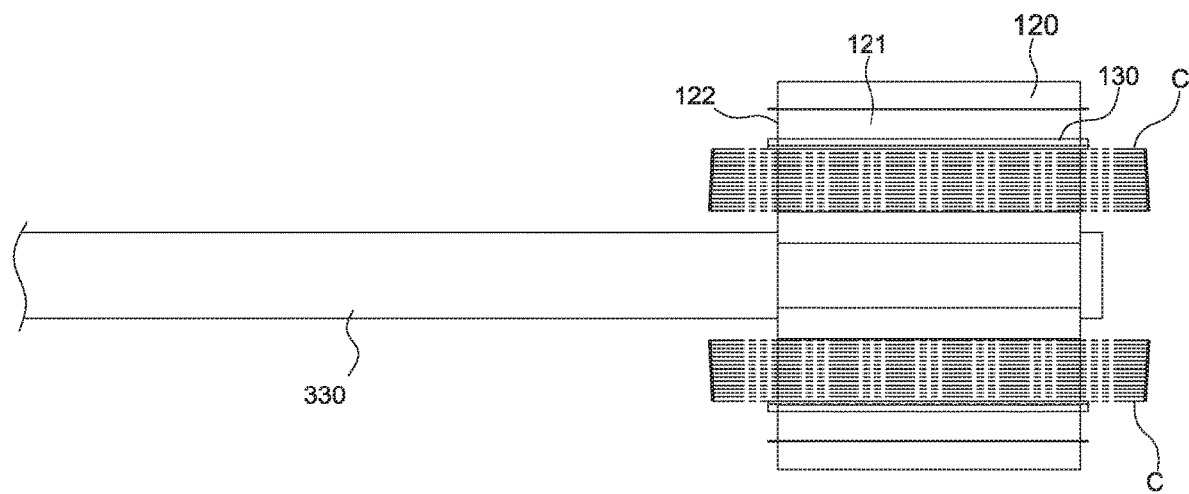
FIG. 35 is a lateral sectional view showing a state in which the transfer block with coils inserted has been inserted into the inner periphery of the stator core.

FIG. 35 is a lateral sectional view showing a state in which the transfer block 100 with coils C inserted has been inserted into the inner periphery of the stator core 120. The transfer block 100 is inserted into the inner periphery of the stator core 120 by moving the spindle 330 in the axial direction.

Figure 36:
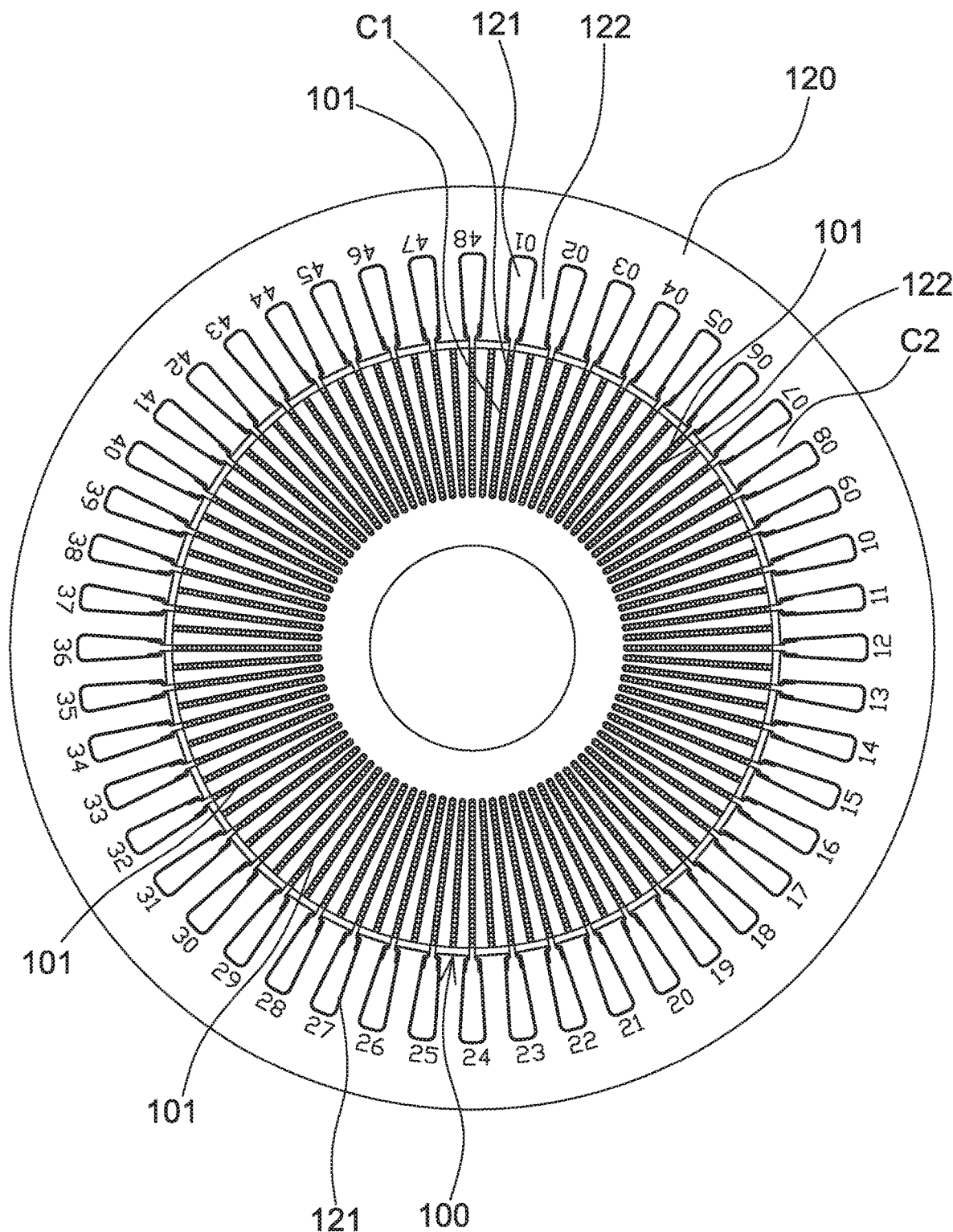
FIG. 36 is an explanatory view as seen from the end face side of the stator core, showing a state in which the transfer block with coils inserted has been inserted into the inner periphery of the stator core.

FIG. 36 is an explanatory view as seen from the end face side of the stator core 120, showing a state in which the transfer block 100 with coils C inserted has been inserted into the inner periphery of the stator core 120. In this embodiment, the stator core 120 has a total of 48 slots, namely, slots 01 to 48. In this case, when, e.g., the holding groove 101 into which the one side C1 of the U-phase coils C have been inserted is arranged so as to be aligned with slot 01, the other side C2 of the coils C are inserted into slot 06.

However, in this embodiment, the insertion angle of both side parts of the coils C into the holding grooves 101 of the transfer block 100, i.e., the angle between holding grooves 101 into which both side parts of the coils C are to be inserted is an angle that is over ½ the array interval of the slots 121 of the stator core 120 with respect to the insertion angle into the corresponding slots 121 of the stator core 120, and the holding groove 101 into which the other side C2 of the coils C have been inserted is therefore arranged between slot 06 and slot 07, and the opening part is block by the teeth 122 positioned therebetween.

Figure 37:
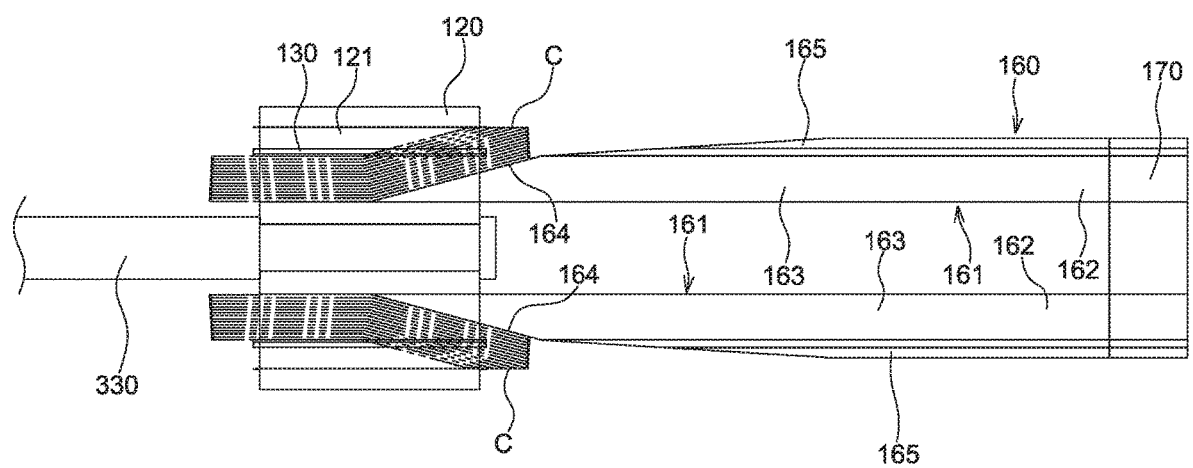
FIG. 37 is a lateral sectional view showing a state in which the pusher has been inserted into the holding groove in which one side of the coils has been inserted, and the one side of the coils is beginning to be inserted into the corresponding slots of the stator core.

In the above-described state, FIG. 37 is a lateral sectional view showing a state in which the pusher 160 has been inserted into the holding groove 101 in which the one side C1 of the coils C has been inserted, and the one side C1 of the coils C is beginning to be inserted into the corresponding slot 121. In other words, the one side C1 of the coils C, being pushed by the distal end part 164 of the pusher 160 that gradually increases in diameter, is inserted into the corresponding slot 121. At this time, in this embodiment, the distal end part of the teeth 122 is covered by the cover members 130, whereby the coils C do not come into direct contact with the teeth 122, and damage to the coils C can thereby be prevented.

Figure 38:
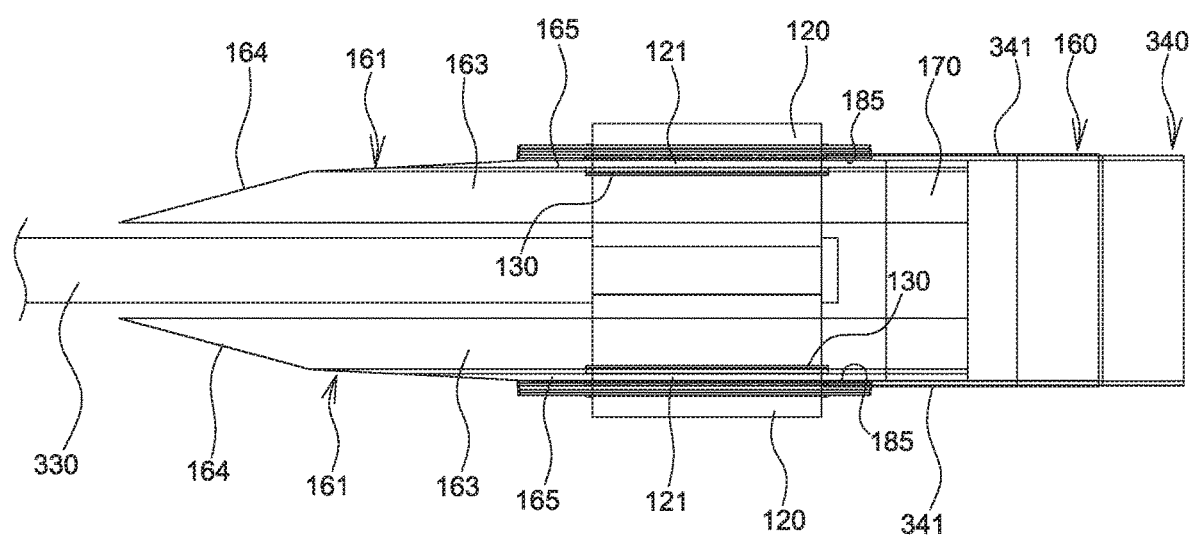
FIG. 38 is a lateral sectional view showing a state in which the slot insulation interphase sheet is inserted by the pusher of the slot interphase insulation sheet insertion device in synchronization with insertion of one side of the coils into the slots of the stator core.

FIG. 38 is a lateral sectional view showing a state in which the slot interphase insulation sheet 185 is inserted by a pusher 341 of the slot interphase insulation sheet insertion device 340 in synchronization with insertion of the one side C1 of the coils C into the slot 121. The slot interphase insulation sheet insertion device 340 has the same structure as the slot entrance insulation sheet insertion device 190 described above, and a description thereof is therefore omitted.

Figure 39:
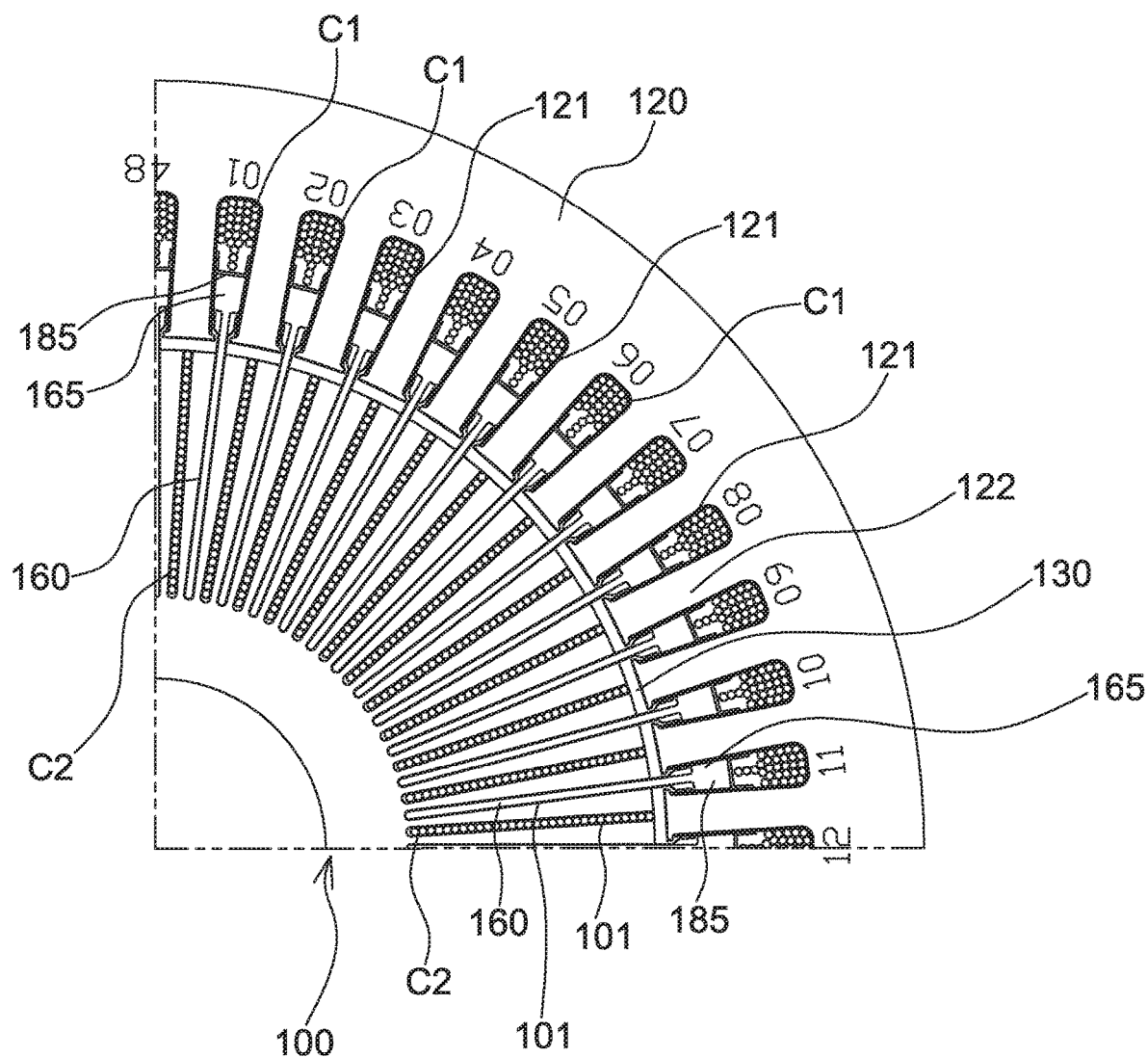
FIG. 39 is an explanatory view as seen from the end face side of the stator core showing the above-described state.

FIG. 39 is an explanatory view as seen from the end face side of the stator core 120 showing the above-described state. In other words, the blades 161 of the pusher 160 are inserted deep into the holding grooves 101, whereby the thick part 165 of the blades 161 shown in FIGS. 8 and 10 is inserted into the slots 121, the slot interphase insulation sheet 185 is pressed to the outer radial side, and the one side C1 of the inserted coils C is moved to the outer radial side of the slots 121.

Figure 40:
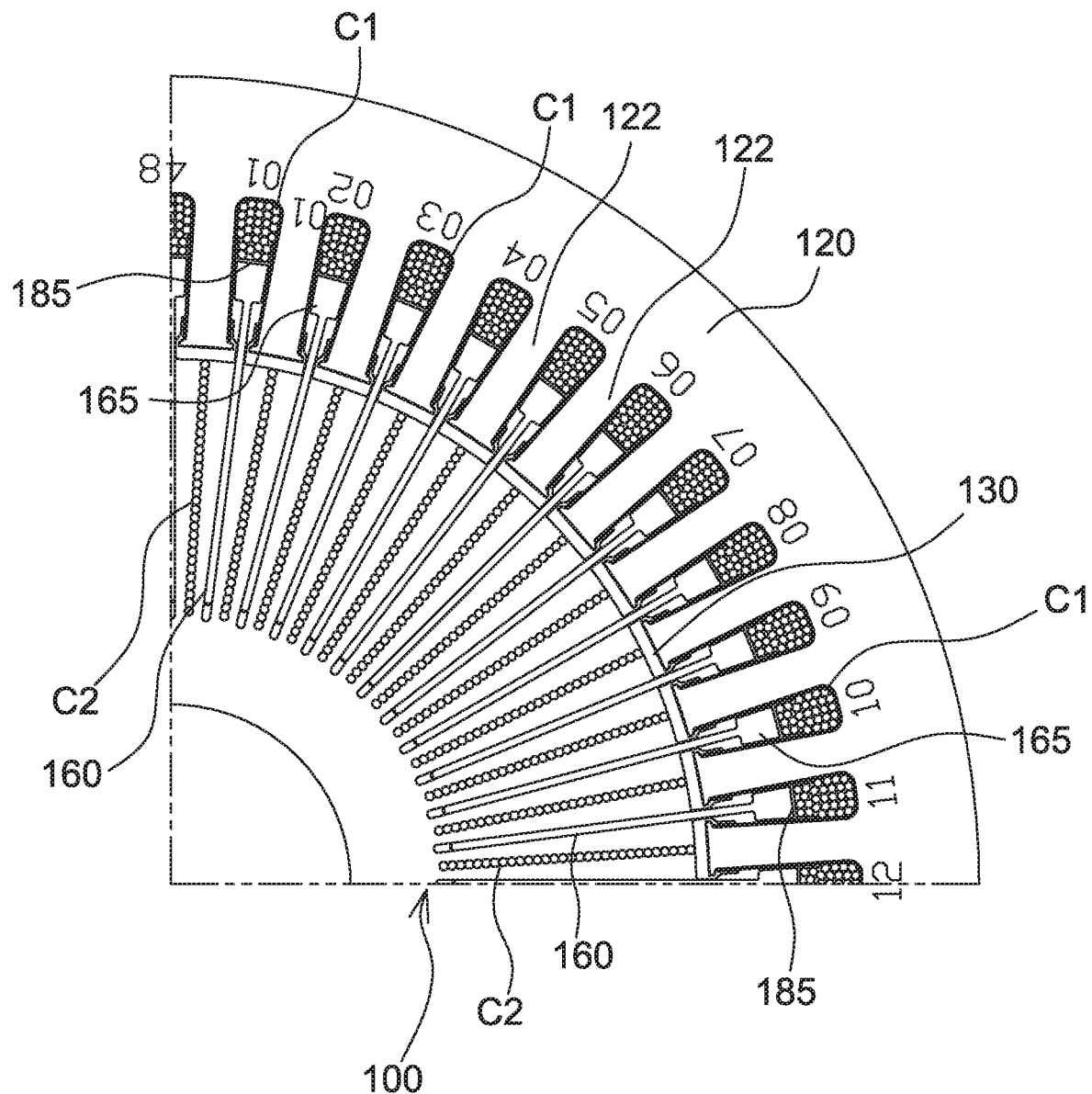
FIG. 40 is an explanatory view as seen from the end face side of the stator core, showing a state in which one side of the coils has been maximally moved to the outer radial side of the slots via a slot interphase insulation sheet.

FIG. 40 is an explanatory view as seen from the end face side of the stator core 120, showing a state in which the one side C1 of the coils C has been maximally moved to the outer radial side of the slots 121 via the slot interphase insulation sheet 185. Thus, when the step for inserting the one side C1 of the coils C into the slots 121 using the blades 161 of the pusher 160 (step for inserting one side of the coils) and the step for inserting the slot interphase insulation sheet 185 (slot interphase insulation sheet insertion step) have ended, the blades 161 which inserted the one side C1 of the coils C are removed from the slots 121 and the holding grooves 101.

Figure 41:
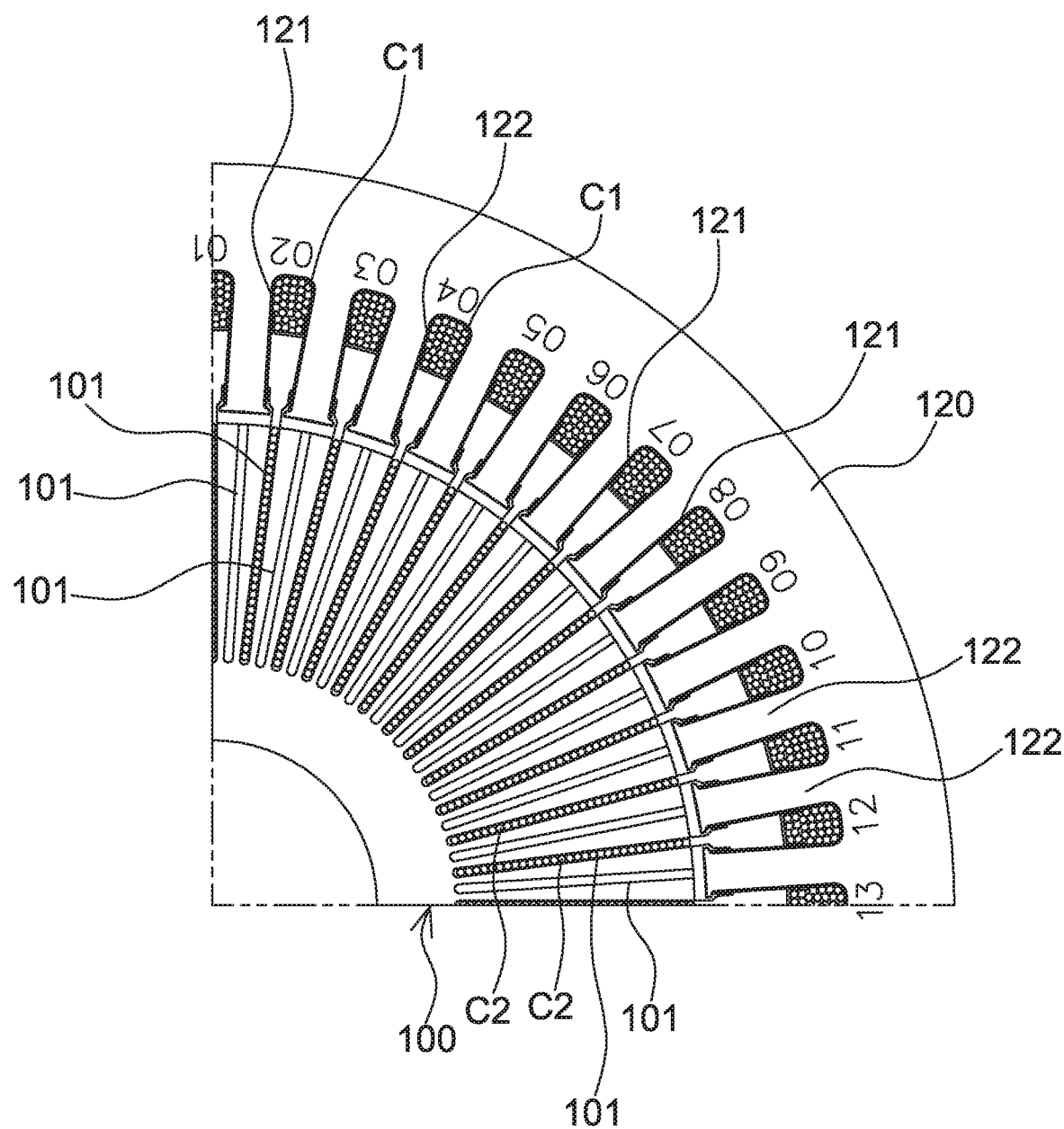
FIG. 41 is an explanatory view as seen from the end face side of the stator core, showing a state in which the holding grooves, with the other side of the coils C inserted, have been aligned with the corresponding slots by relatively rotating the transfer block in the direction of the grooves, with the corresponding one side of the coils inserted, at an angle of half the array interval of the slots with respect to the stator core.

FIG. 41 is an explanatory view as seen from the end face side of the stator core 120, showing a state in which the holding grooves 101, with the other side C2 of the coils C inserted, have been aligned with the corresponding slots 121 by relatively rotating the transfer block 100 in the direction of the grooves, with the corresponding one side C1 of the coils C had been inserted, at an angle of half the array interval of the slots 121 with respect to the stator core 120. As described above, the transfer block 100 is relatively rotated in the direction of the grooves, with the corresponding one side C1 of the coils C had been inserted, at an angle of half the array interval of the slots 121 with respect to the stator core 120, whereby the one side C1 of the coils C that have already been inserted into the slot 121 loosen, and the later-described coil-end interphase insulation sheet 308 can be more readily inserted.

Figure 42:
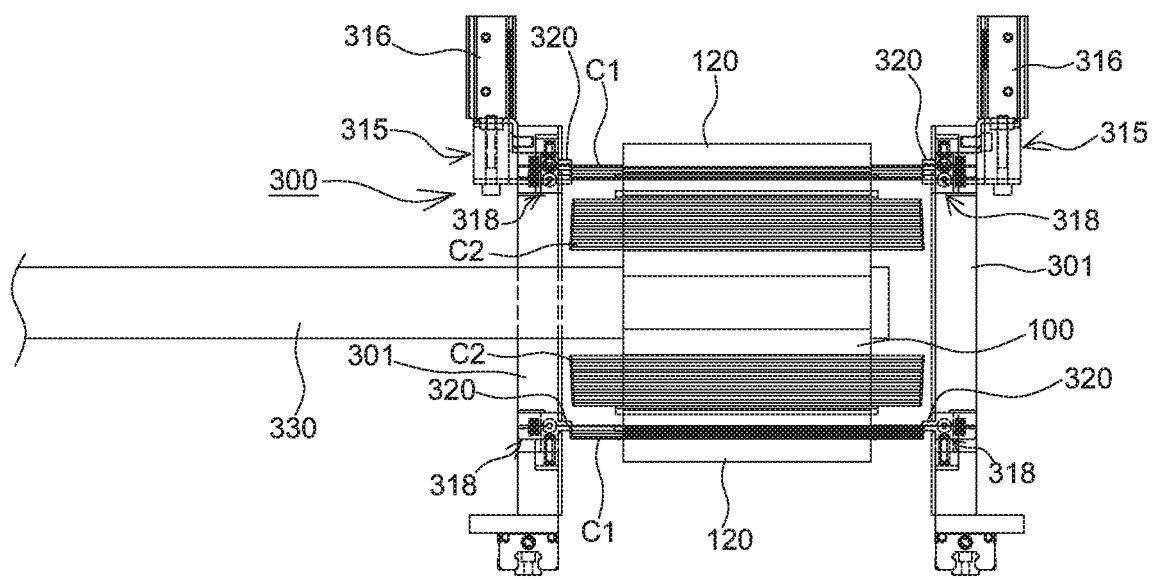
FIG. 42 is a lateral sectional view showing a state in which an annular holder of the coil-end interphase insulation sheet insertion device has been disposed in proximity to both end faces of the stator core in the above-described state.

FIG. 42 is a lateral sectional view showing a state in which the annular holder 301 of the coil-end interphase insulation sheet insertion device 300 has been disposed in proximity to both end faces of the stator core 120 in the above-described state. Although not specifically shown in the drawing, the coil-end interphase insulation sheet 308 is held in the clamp bodies 320 of the clamp units 318 provided to the annular holders 301 by the above-described coil-end interphase insulation sheet insertion device 300 (see FIGS. 27 to 30).

Figure 43:
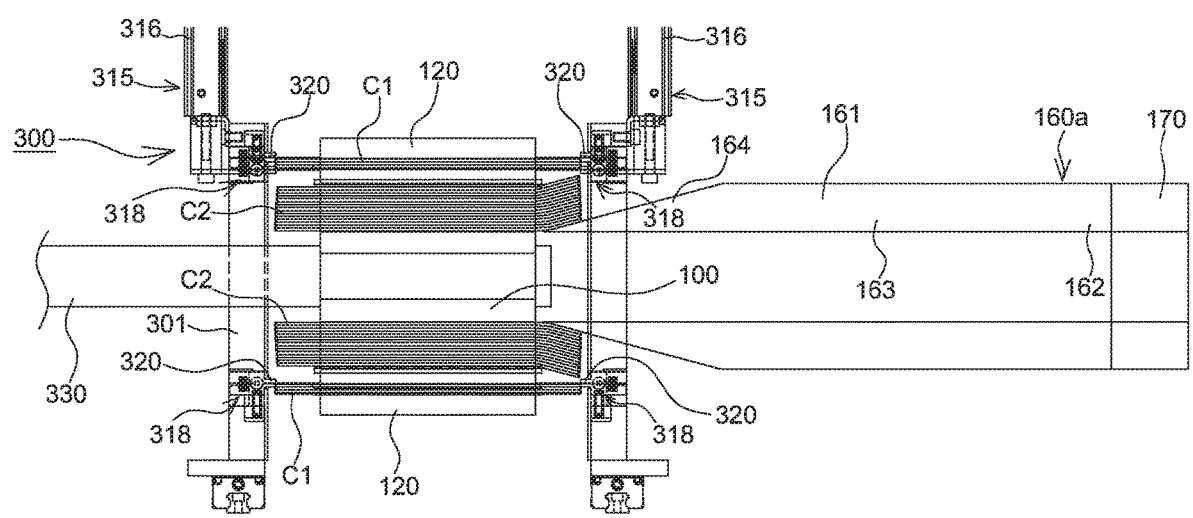
FIG. 43 is a lateral sectional view showing a state in which the blade of the pusher has been inserted into the holding groove of the transfer block, and the other side of the coils is beginning to be inserted into the corresponding slots of the stator core in the above-described state.

FIG. 43 is a lateral sectional view showing a state in which the blade 161 of the pusher 160a has been inserted into the holding groove 101 of the transfer block 100, and the other side C2 of the coils C is beginning to be inserted into the corresponding slots 121 of the stator core 120 in the above-described state (step for inserting the other side of the coils). The pusher 160a for inserting the other side C2 of the coils C is different from the pusher 160 for inserting the one side C1 of the coils C shown in FIGS. 8 to 10 in that a thick part 165 is not provided. When the other side C2 of the coils C is inserted by the pusher 160a into the corresponding slots 121 of the stator core 120, the annular holders 301 of the coil-end interphase insulation sheet insertion device 300 described above rotates, the coil-end interphase insulation sheet 308 held in the clamp bodies 320 of the clamp units 318 is sandwiched between the coil ends of the one side C1 of the coils C and the coil ends of the other side C2 of coils C.

Figure 44:
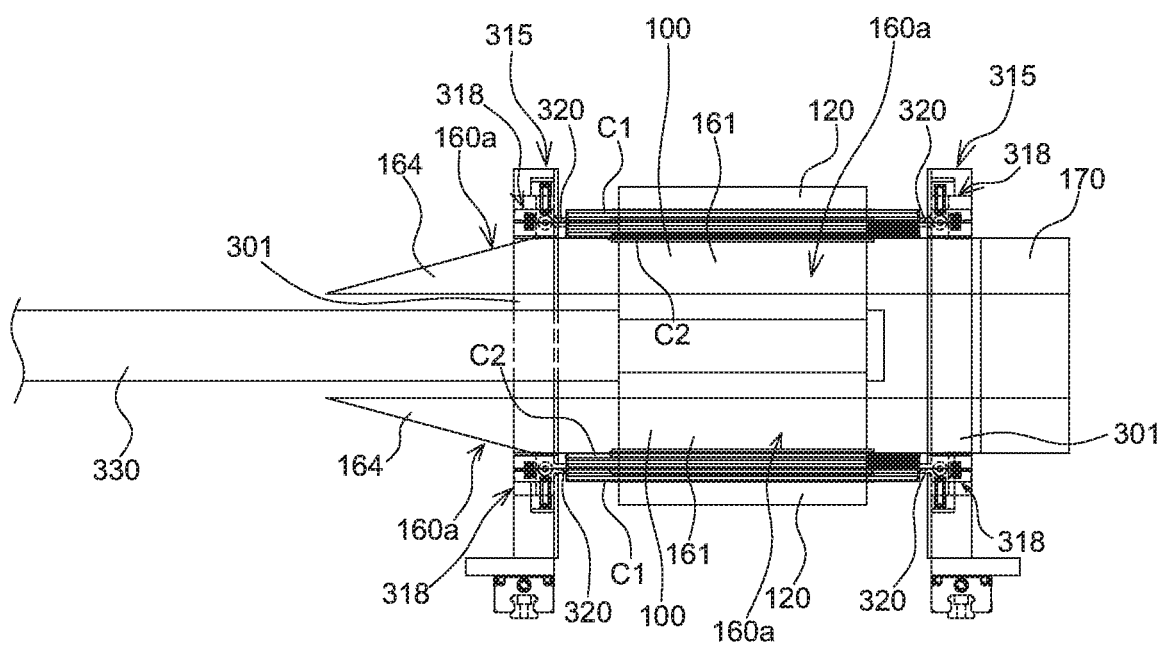
FIG. 44 is a lateral sectional view showing a state in which the blade of the pusher has been completely pressed into the holding groove of the transfer block in the above-described state.

FIG. 44 is a lateral sectional view showing a state in which the blade 161 of the pusher 160a has been completely pressed into the holding groove 101 of the transfer block 100 in the above-described state. The other side C2 of the coils C is thereby inserted into the corresponding slot 121 of the stator core 120. In this embodiment, the distal end part of the teeth 122 is covered by the cover members 130 during insertion of the other side C2 of the coils C as well, whereby the coils C do not come into direct contact with the teeth 122, and damage to the coils C can thereby be prevented.

Figure 45:
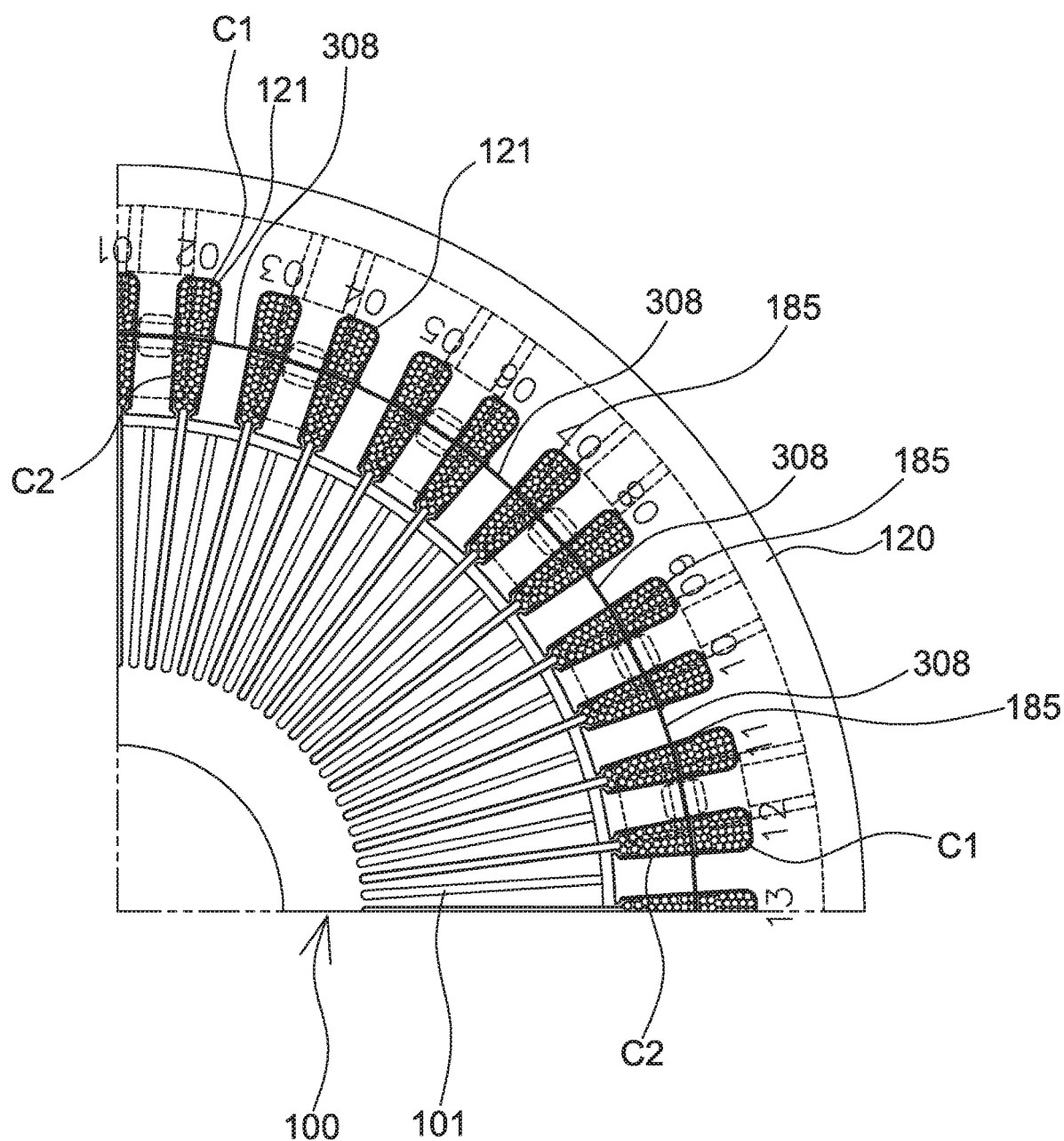
FIG. 45 is an explanatory view as seen from the end face side of the stator core, showing the above-described state.

FIG. 45 is an explanatory view as seen from the end face side of the stator core 120 showing the above-described state. The one side C1 of the coils C is inserted into the outer radial side of the corresponding slots 121, the other side C2 of the coils C is inserted into the inner radial side of the slots 121 via the slot interphase insulation sheet 185. The coil-end interphase insulation sheet 308 is held between the coil ends of the one side C1 of the coils C and the coil ends of the other side C2 of the coils C which are adjacent to the coil ends of the one side of the coils, and different phases of the coil ends are insulated by the coil-end interphase insulation sheet 308.

Figure 46:
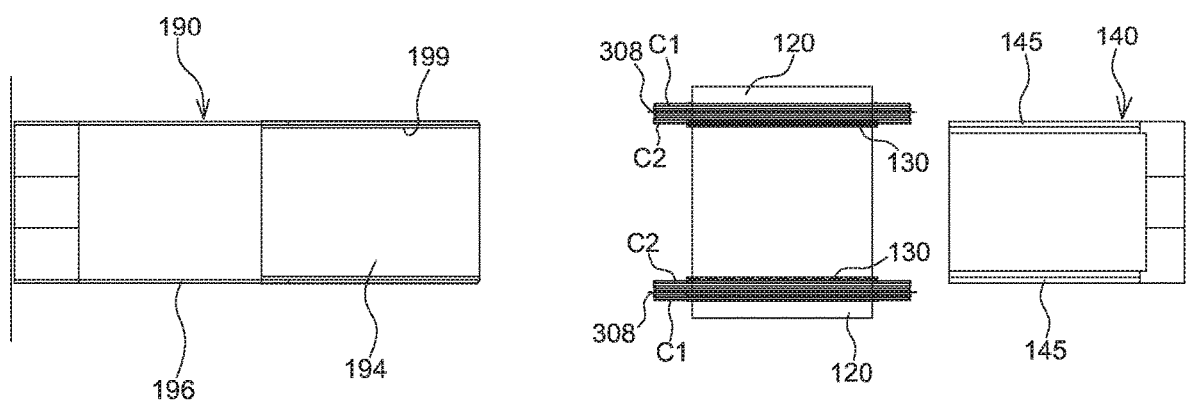
FIG. 46 is a lateral sectional view showing a state in which the transfer block has been pulled out from the inner periphery of the stator core, the slot entrance insulation sheet insertion device has been brought into proximity to one end side of the stator core, and the cover member attaching/detaching device has been brought into proximity with the other end side of the stator core.

FIG. 46 is a lateral sectional view showing a state in which the transfer block 100 has been pulled out from the inner periphery of the stator core 120, the slot entrance insulation sheet insertion device 190 has been brought into proximity to one end side of the stator core 120, and the cover member attaching/detaching device 140 has been brought into proximity to the other end side of the stator core 120. The cover member 130 is still in a state mounted the teeth 122 of the stator core 120.

Figure 47:
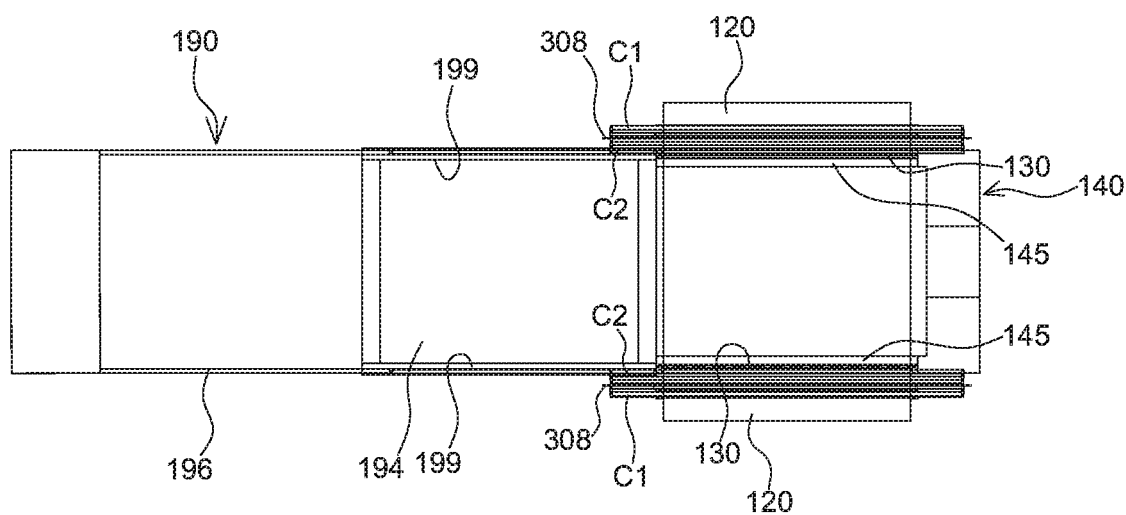
FIG. 47 is a lateral sectional view showing a state in which the holder of the cover member attaching/detaching device has been inserted from the other end face side of the stator core into the inner periphery of the stator core, and the distal end part of the slot entrance insulation sheet of the slot entrance insulation sheet insertion device has been brought into proximity with one end face of the stator core.

FIG. 47 is a lateral sectional view showing a state in which the holder 145 of the cover member attaching/detaching device 140 has been inserted from one end face side of the stator core 120 into the inner periphery of the stator core 120, and the distal end part of the slot entrance insulation sheet 199 of the slot entrance insulation sheet insertion device 190 has been brought into proximity to the other end face of the stator core 120. In this state, the cam member 149 is retracted, the bottom face of the cam follower 150 is brought into conformity with the front slope face 149a and the flat face 149b, and the stopper pin 152 is caused to engage the stopper hole 133, thereby allowing the cover member 130 to be held. The slide block 142 is retracted by the first servomotor drive device 143, and the cover member 130 can be removed from the one end face side of the stator core 120 and be detached from the distal end part of the teeth 122. In synchronization therewith, the wedge pusher 196 of the slot entrance insulation sheet insertion device 190 is pushed inward, and the slot entrance insulation sheet 199 is inserted from the other end face side of the stator core 120. At this time, the slot entrance insulation sheet 199 enters when the cover member 130 is removed, and the slot entrance insulation sheet 199 can therefore be smoothly inserted.

Figure 48:
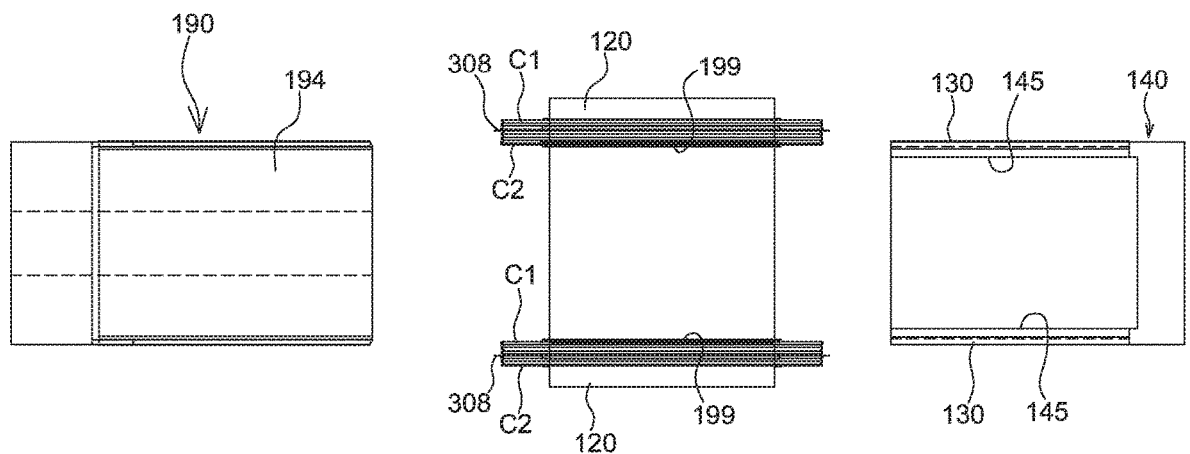
FIG. 48 is an explanatory view showing a state in which the cover member has been pulled out and the slot entrance insulation sheet has been inserted, after which the cover member attaching/detaching device and the slot entrance insulation sheet insertion device have been retracted from the stator core.

FIG. 48 shows a state in which the cover member 130 has been pulled out and the slot entrance insulation sheet 199 has been inserted, after which the cover member attaching/detaching device 140 and the slot entrance insulation sheet insertion device 190 have been retracted from the stator core 120.

Figure 49:
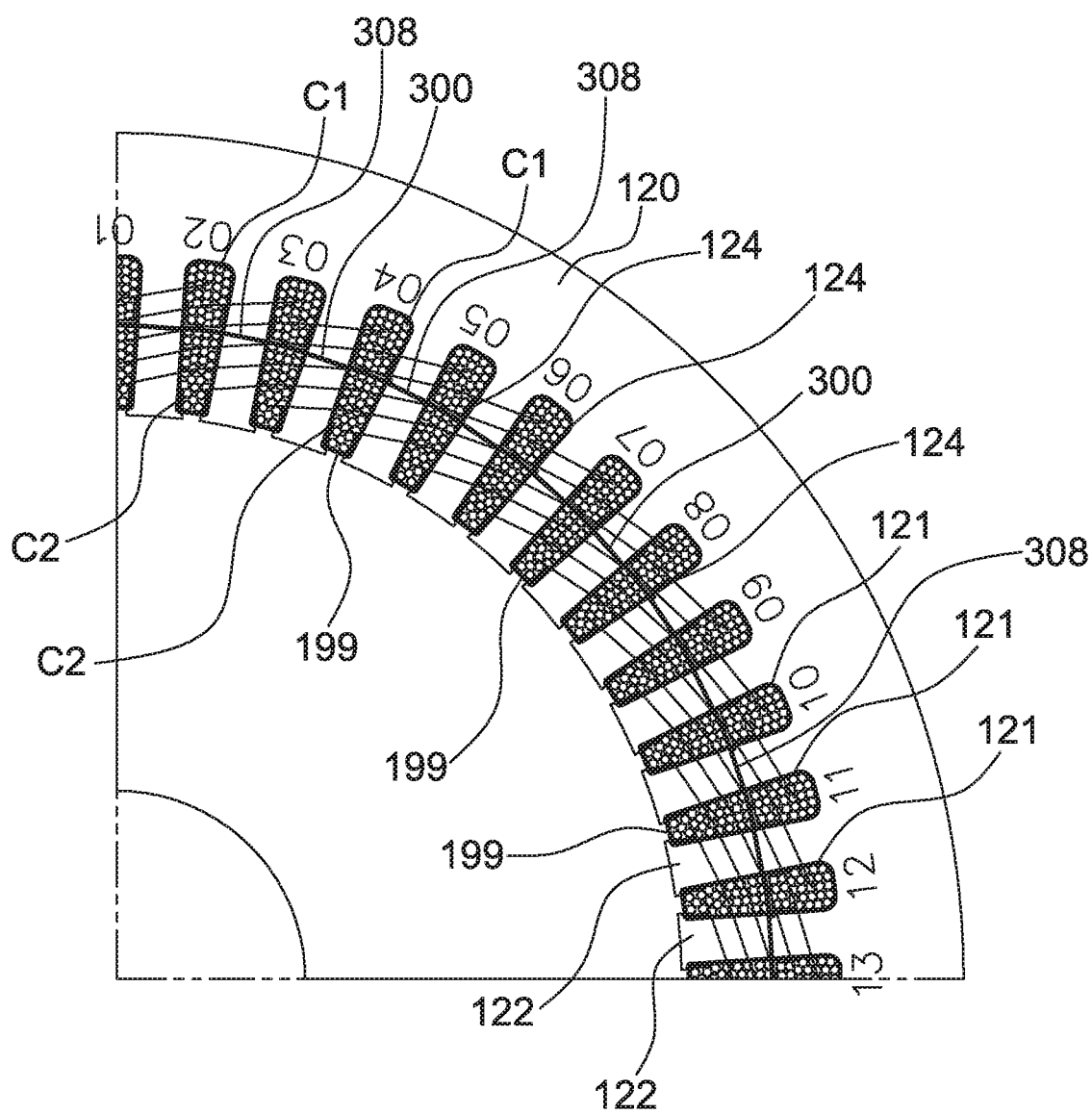
FIG. 49 is an explanatory view in which the stator core thusly completed with coil insertion is seen from the end face side of the stator core.

FIG. 49 is an explanatory view in which the stator core 120 thusly completed with coil insertion is seen from the end face side of the stator core. The one side C1 of the coils C is inserted into the outer radial side of the slots 121 of the stator core 120, the other side C2 of the coils C is inserted into the inner radial side of the slots 121, and the coils C1 of the outer radial side and the coils C2 of the inner radial side have an area where the phases are different. For this reason, the slot interphase insulation sheet 185 is inserted between the coils C1 of the outer radial side and the coils C2 of the inner radial side, and short-circuiting of the coils between different phases is prevented. The coil-end interphase insulation sheet 308 is held between the coil ends of the coils C1 of the outer radial side and the coil ends of the other coils C2 of the inner radial side, and short-circuiting of the coil ends of different phases is prevented.

Furthermore, the coils C held in a state spirally overlapped in advance on the transfer block 100 are pushed radially outward toward predetermined slots 121 of the stator core 120 and are inserted into the slots 121 from the inner peripheral side of the stator core 120, whereby the coils C can be inserted in a spirally overlapping state into the slots 121 of the stator core 120, and the coil ends can be shortened. As such, a spirally wound stator core that can make rotation smooth can be mechanically manufactured with good efficiency, whereby the efficiency of a motor, etc., can be increased.

What is claimed is:

1. A coil insertion method comprising:
   a winding step for winding U-phase, V-phase, and W-phase coils;
   a first inserting step, the first inserting step including inserting the U-phase, V-phase, and W-phase coils in a plurality of holding grooves of a transfer block so as to hold the coils in the holding grooves in a state in which the coils spirally overlap, the transfer block having a columnar shape, and the holding grooves being formed radially around the transfer block so as to open from a center axis of the transfer block toward an outer periphery thereof; and
   a second inserting step, the second inserting step including inserting the transfer block into an inner periphery of a stator core, and pushing a side part of the coils held in the holding grooves radially outward toward predetermined slots of the stator core so as to insert the side part of the coils from an inner peripheral side of the stator core into the slots,
   wherein:
   prior to inserting the transfer block into the inner periphery of the stator core, a cover-mounting step is carried out for mounting a cover member on teeth of the stator core, the cover member covering a distal end face of the teeth of the stator core, a side face of a diameter-expanding rib that protrudes from both sides of a distal end of the teeth, and a rear side of the diameter-expanding rib, and
   insertion of the coils into the slots in the second inserting step is carried out through space between the teeth covered by the cover member.

2. The coil insertion method as recited in claim 1, wherein:
   the holding grooves are arranged at an interval of half of an array interval of the slots of the stator core and in a quantity that is two times the number of slots, and
   the second inserting step includes:
      when inserting the transfer block into the inner periphery of the stator core, a first side inserting step for aligning the holding grooves into which a first side of the coils has been inserted with predetermined slots of the stator core, and pushing the first side radially outward so as to insert the first side into the slots from the inner peripheral side of the stator core,
      a slot interphase insulation sheet insertion step for inserting a slot interphase insulation sheet into the slots of the stator core into which the first side of the coils has been inserted, and
      a second side inserting step including rotating the transfer block and the stator core with respect to each other at an angle of half of the array interval of the slots such that the holding grooves into which a second side of the coils has been inserted is aligned with the predetermined slots of the stator core, and pushing the second side radially outward so as to insert the second side into the slots from the inner peripheral side of the stator core.

3. The coil insertion method as recited in claim 2, wherein, in the second inserting step, the second side inserting step is performed after the first side inserting step and the slot interphase insulation sheet insertion step, and in a state in which the transfer block is rotated at an angle of half of the array interval of the slots and a coil-end interphase insulation sheet is arranged on an inner side of coil ends of the first side, and the coil-end interphase insulation sheet is held between the coil ends of different phases.

4. The coil insertion method as recited in claim 3, wherein, in the first inserting step, the coils are inserted into the holding grooves of the transfer block at an angle of more than half of the array interval of the slots of the stator core with respect to an angle at which the coils are inserted into corresponding grooves of the slots of the stator core, and
   in the second side inserting step, when the transfer block and the stator core are rotated with respect to each other at the angle of half of the array interval of the slots, the transfer block is rotated toward a direction in which the grooves in which the first side of the coils has been inserted are located, whereby the holding grooves into which the second side of the coils has been inserted are aligned with the corresponding slots.

5. The coil insertion method as recited in claim 2, wherein the first side inserting step and the second side inserting step are carried out using a pusher including blades, each blade having a plate shape and a thickness that allows for insertion into the holding grooves and including a coil pressing part provided at a distal end part thereof, the coil pressing part being sloped so as to gradually narrow toward the distal end of the blade,
   the blades used in the first side inserting step have a thick part provided to an outer radial side of an intermediate part thereof, the thick part being inserted into the slots of the stator core in the first side inserting step, and
   in the first inserting step, the blades are inserted into the holding grooves from a first end face side of the transfer block to thereby insert the first side of the coils into the corresponding slots of the stator core, and concurrent to the operation for inserting the first side of the coils, the slot interphase insulation sheet is inserted into the slots in the slot interphase insulation sheet insertion step and pressed to an outer radial side of the slots by the thick part of the blades, whereby the first side of the coils is moved to the outer radial side of the slots.

6. The coil insertion method as recited in claim 1, wherein, after insertion of the coils into the slots of the stator core has been completed, the cover member is removed from a first end face side of the stator core, and a slot entrance insulation sheet is inserted from a second end face side of the stator core into an inner side of the teeth of the slots.

7. A coil insertion device comprising:
   a winding machine having a bobbin for forming a U-phase coil, a bobbin for forming a V-phase coil, and a bobbin for forming a W-phase coil, the winding machine changing a winding direction to form a plurality of coils along a lengthwise direction of the bobbins;
   a transfer block having a columnar shape and a plurality of holding grooves, the holding grooves being formed radially around the transfer block so as to open from a center axis of the transfer block toward an outer periphery thereof;

a first insertion device configured to arrange both side parts of an end face of each of the bobbins so that the coils wound by the winding machine align with corresponding holding grooves of the transfer block, and to sequentially insert both side parts of the coils formed by the bobbins into the corresponding holding grooves, whereby the U-phase, V-phase, and W-phase coils are inserted into the holding grooves so as to spirally overlap;

a second insertion device configured to insert the transfer block into an inner periphery of a stator core, align the holding grooves of the transfer block into which the coils have been inserted with corresponding slots of the stator core, and insert the coils into the slots; and a cover member attaching/detaching device for mounting a cover member on teeth of the stator core and removing the cover member mounted on the teeth of the stator core, wherein:

the cover member, when mounted on the teeth of the stator core, covers a distal end face of the teeth of the stator core, a side face of a diameter-expanding rib that protrudes from both sides of a distal end of the teeth, and a rear side of the diameter-expanding rib, and prior to the transfer block being inserted into the inner periphery of the stator core, the cover member is mounted on the teeth, and insertion of the coils held in the holding grooves of the transfer block into the slots of the stator core is carried out through space between the teeth covered by the cover member.

8. The coil insertion device as recited in claim 7, wherein:

the holding grooves are arranged at an interval of half of an array interval of the slots of the stator core and in a quantity that is two times the number of slots, the second insertion device is configured to insert the transfer block into the inner periphery of the stator core, align the holding grooves of the transfer block into which a first side part of the coils has been inserted with corresponding slots of the stator core, insert the first side part of the coils into the slots, subsequently rotate the transfer block at an angle of half of the array interval of the slots so as to align the holding grooves into which the second side part of the coils has been inserted with the corresponding slots of the stator core, and insert the second side part of the coils into the slots, and the second insertion device comprises a slot interphase insulation sheet insertion device configured to insert a slot interphase insulation sheet into the slots after the first side part of the coils has been inserted into the slots and prior to the second side part of the coils being inserted into the slots.

9. The coil insertion device as recited in claim 8, further comprising a coil-end interphase insulation sheet insertion device configured to, prior to the second side part of the coils being inserted into the slots, arranging a coil-end interphase insulation sheet on an inner side of coil ends of the first side part of the coils, the coil ends protruding from an end face of the stator core, and sandwiching the coil-end interphase insulation sheet between coil ends of different phases.

10. The coil insertion device as recited in claim 8, wherein a width of both side parts of the bobbins is set so that both side parts of the coils are inserted into the corresponding holding grooves of the transfer block at an angle that is more than half of the array interval of the slots of the stator core with respect to an angle at which both side parts of the coil are inserted into the corresponding slot of the stator core.

11. The coil insertion device as recited in claim 8, wherein:

the second insertion device comprises a pusher including blades, each blade having a plate shape and a thickness that allows for insertion into the holding grooves and including a coil pressing part provided at a distal end part thereof, the coil pressing part being sloped so as to gradually narrow toward the distal end of the blade, the blades used to insert the first side part of the coils into the corresponding slots of the stator core have a thick part provided to an outer radial side of an intermediate part thereof, the thick part being insertable into the slots of the stator core, and the second insertion device is configured so that in inserting the first side part of the coils into the corresponding slots of the stator core, the slot interphase insulation sheet is inserted into the slots by the slot interphase insulation sheet insertion device, and the slot interphase insulation sheet is pressed to the outer radial side of the slots by the thick part of the blades, whereby the first side part of the coils is moved to the outer radial side of the slots.

12. The coil insertion device as recited in claim 7, further comprising a slot entrance insulation sheet insertion device for inserting a slot entrance insulation sheet into an inner side of the teeth of the slots, wherein, after insertion of the coils into the slots of the stator core has ended, insertion of the slot entrance insulation sheet into the inner side of the teeth of the slots is carried out by the slot entrance insulation sheet insertion device in synchronization with an operation for removing the cover member using the cover member attaching/detaching device.

* * * * *